(12) United States Patent
Zhang et al.

(10) Patent No.: US 12,362,591 B2
(45) Date of Patent: Jul. 15, 2025

(54) PHOTOVOLTAIC SYSTEM AND DIRECT CURRENT OVERCURRENT PROTECTION APPARATUS

(71) Applicant: Huawei Digital Power Technologies Co., Ltd., Shenzhen (CN)

(72) Inventors: Xiufeng Zhang, Dongguan (CN); Xiaokang Tian, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 27 days.

(21) Appl. No.: 18/397,404

(22) Filed: Dec. 27, 2023

(65) Prior Publication Data

US 2024/0128789 A1    Apr. 18, 2024

Related U.S. Application Data

(63) Continuation of application No. PCT/CN2021/103736, filed on Jun. 30, 2021.

(51) Int. Cl.
*H02J 7/35* (2006.01)
*H02J 3/38* (2006.01)
*H02J 7/00* (2006.01)

(52) U.S. Cl.
CPC ............. *H02J 7/35* (2013.01); *H02J 3/381* (2013.01); *H02J 7/00304* (2020.01)

(58) Field of Classification Search
CPC .. H02J 7/35; H02J 7/00; H02J 7/00304; H02J 3/38
See application file for complete search history.

(56) References Cited

U.S. PATENT DOCUMENTS

| | | | |
|---|---|---|---|
| 4,746,886 A | 5/1988 | Uetsuhara | |
| 2015/0294825 A1 | 10/2015 | Zhou et al. | |

FOREIGN PATENT DOCUMENTS

| | | |
|---|---|---|
| CN | 102055178 A | 5/2011 |
| CN | 107123568 A | 9/2017 |
| JP | S63296320 A | 12/1988 |

*Primary Examiner* — Robert L Deberadinis
(74) *Attorney, Agent, or Firm* — Maier & Maier, PLLC

(57) ABSTRACT

A photovoltaic system includes at least one first direct current module, an electromagnetic apparatus, a direct current switch-on/off apparatus, and a second direct current module. First connection ends of all first direct current modules in the at least one first direct current module are connected in parallel and then connected to a first connection end of the electromagnetic apparatus, a second connection end and a third connection end of the electromagnetic apparatus are connected to a first connection end of the second direct current module by using the direct current switch-on/off apparatus, and second connection ends of all the first direct current modules are connected in parallel and then connected to a second connection end of the second direct current module. The electromagnetic apparatus is configured to control the direct current switch-on/off apparatus to disconnect a loop between each first direct current module and the second direct current module.

20 Claims, 11 Drawing Sheets

PHOTOVOLTAIC SYSTEM AND DIRECT CURRENT OVERCURRENT PROTECTION APPARATUS

CROSS-REFERENCE TO RELATED APPLICATIONS

This application is a continuation of International Application No. PCT/CN2021/103736, filed on Jun. 30, 2021, the disclosure of which is hereby incorporated by reference in its entirety.

TECHNICAL FIELD

The embodiments relate to the field of power technologies and to a photovoltaic system and a direct current overcurrent protection apparatus.

BACKGROUND

A conventional direct current overcurrent protection device (for example, a direct current circuit breaker and a direct current fuse) may trigger overcurrent protection when an absolute value of a current goes beyond a specific range of a rated current value, to cut off a current in a loop.

When the direct current circuit breaker is applied to a photovoltaic system, as shown in FIG. 1, the photovoltaic system may include a string 1 to a string 4, a direct current circuit breaker 1 to a direct current circuit breaker 4, and a direct current (DC/DC) converter. One string is connected to one direct current circuit breaker in series and then is connected to the DC/DC converter. An output end of the DC/DC converter may be connected to a load. When the string 1 to the string 4 work normally, a maximum current flowing through the direct current circuit breaker is less than a rated current of the direct current circuit breaker, and the direct current circuit breaker 1 to the direct current circuit breaker 4 are all switched on to connect the string 1 to the string 4 and the DC/DC converter. In this case, the string 1 to the string 4 may provide a direct current voltage for the DC/DC converter, and the DC/DC converter may supply power to the load based on the direct current voltage. When the string 4 is faulty, the string 1, a string 2, and a string 3 provide feedback to the string 4. In this case, a backflow current (that is, a reverse current) flowing through the direct current circuit breaker 4 is less than a tripping current of the direct current circuit breaker 4. Therefore, overcurrent protection of the direct current circuit breaker 4 is not triggered (that is, the direct current circuit breaker is switched on). However, because the backflow current is greater than a withstand current of the string, the string is damaged, overcurrent protection for the reverse current cannot be implemented. In addition, costs are high because each string needs to be connected to one direct current circuit breaker in series.

SUMMARY

The embodiments include a photovoltaic system and a direct current overcurrent protection apparatus, to perform overcurrent protection for a reverse current flowing to each first direct current module. In this way, costs are low.

According to a first aspect, the embodiments provide a photovoltaic system. The photovoltaic system includes at least one first direct current module, an electromagnetic apparatus, a direct current switch-on/off apparatus, and a second direct current module. The electromagnetic apparatus and the direct current switch-on/off apparatus herein may form a direct current overcurrent protection apparatus. First connection ends of all first direct current modules in the at least one first direct current module are connected in parallel and then connected to a first connection end of the electromagnetic apparatus, a second connection end and a third connection end of the electromagnetic apparatus may be connected to a first connection end of the second direct current module by using the direct current switch-on/off apparatus, and second connection ends of all the first direct current modules may be connected in parallel and then connected to a second connection end of the second direct current module. Optionally, the photovoltaic system may alternatively include a plurality of second direct current modules, a plurality of electromagnetic apparatuses, and a plurality of direct current switch-on/off apparatuses. This may be determined based on an actual application scenario, and is not limited herein. When the photovoltaic system runs normally, a current (for example, a forward current) flows from each first direct current module to the second direct current module. In this case, the electromagnetic apparatus does not control the direct current switch-on/off apparatus to disconnect a loop between each first direct current module and the second direct current module. When the first direct current module is faulty, the electromagnetic apparatus may be configured to: when a current (for example, a reverse current) flows from the second direct current module to each first direct current module and an amplitude of the current is greater than a preset amplitude, control the direct current switch-on/off apparatus to disconnect the loop between each first direct current module and the second direct current module. In the embodiments, the electromagnetic apparatus may trigger the direct current switch-on/off apparatus to disconnect the loop between each first direct current module and the second direct current module, to implement overcurrent protection for the reverse current flowing to each first direct current module. In addition, a quantity of electromagnetic apparatuses and a quantity of direct current switch-on/off apparatuses (that is, direct current overcurrent protection apparatuses) in the photovoltaic system are reduced, costs are lower, and a system structure is simplified.

With reference to the first aspect, in a first possible implementation, the direct current switch-on/off apparatus includes a switch-off apparatus (which may also be referred to as a tripping apparatus), a moving contact, and a fixed contact, the second connection end of the electromagnetic apparatus may be connected to the moving contact or the fixed contact, and the third connection end of the electromagnetic apparatus may be coupled to the moving contact and the fixed contact by using the switch-off apparatus. When the second connection end of the electromagnetic apparatus is connected to the moving contact, the fixed contact may be connected to the second direct current module. On the contrary, when the second connection end of the electromagnetic apparatus is connected to the fixed contact, the moving contact may be connected to the second direct current module. The electromagnetic apparatus may be configured to: when the current (for example, the reverse current) flows from the second direct current module to each first direct current module and the amplitude of the current is greater than the preset amplitude, trigger the switch-off apparatus to drive the moving contact to be separated from the fixed contact, to disconnect the loop between each first direct current module and the second direct current module. In the photovoltaic system provided in the embodiments, when an amplitude of the reverse current is greater than the preset amplitude, the electromagnetic apparatus may trigger the switch-off apparatus to drive the moving contact to be separated from the fixed contact, to implement overcurrent protection for the reverse current flowing to each first direct current module.

With reference to the first possible implementation of the first aspect, in a second possible implementation, the electromagnetic apparatus includes a magnetic yoke, a coil, a permanent magnet, a moving iron core, and a spring. The magnetic yoke may completely cover the coil, the permanent magnet, and a part that is of the moving iron core and that faces the first direct current module, and the magnetic yoke may partially cover a part that is of the moving iron core and that faces the second direct current module. The coil may be wound on the moving iron core, the permanent magnet is placed at an end that is of the moving iron core and that faces the first direct current module, an end that is of the moving iron core and that faces the second direct current module may be used as the third connection end of the electromagnetic apparatus to pass through the magnetic yoke and to be connected to the switch-off apparatus, the spring may wrap a part that is of the moving iron core and that passes through the magnetic yoke, an input end of the coil may be used as the first connection end of the electromagnetic apparatus to be connected to the first connection ends of all the first direct current modules, and an output end of the coil may be used as the second connection end of the electromagnetic apparatus to be connected to the moving contact or the fixed contact. The moving iron core may be configured to be ejected in a direction of the switch-off apparatus when the current flows from the second direct current module to each first direct current module and the amplitude of the current is greater than the preset amplitude, to trigger the switch-off apparatus to drive the moving contact to be separated from the fixed contact, so as to disconnect the loop between each first direct current module and the second direct current module. In the photovoltaic system provided in the embodiments, the moving iron core may be ejected in the direction of the switch-off apparatus when the amplitude of the reverse current is greater than the preset amplitude, to implement overcurrent protection for the reverse current flowing to each first direct current module.

With reference to the second possible implementation of the first aspect, in a third possible implementation, the moving iron core is further configured to: when the current flows from each first direct current module to the second direct current module, keep a location relative to the permanent magnet unchanged, to control the moving contact to keep connected to the fixed contact, so as to conduct the loop between each first direct current module and the second direct current module. It can be understood that the moving iron core does not trigger an action of the switch-off apparatus for the forward current. In this case, the moving contact keeps connected to the fixed contact, to conduct the loop between each first direct current module and the second direct current module.

With reference to the first possible implementation of the first aspect, in a fourth possible implementation, the electromagnetic apparatus includes a magnetic yoke, a first coil, a second coil, a first permanent magnet, a second permanent magnet, and a moving iron core. The magnetic yoke may completely cover the first coil, the second coil, the first permanent magnet, the second permanent magnet, and a part that is of the moving iron core and that faces the first direct current module, and the magnetic yoke may partially cover a part that is of the moving iron core and that faces the second direct current module. The first coil and the second coil may be wound on the moving iron core, a winding direction of the first coil is opposite to a winding direction of the second coil, the first coil and the second coil are connected in series, and the first permanent magnet and the second permanent magnet are placed between the first coil and the second coil. An input end of the first coil herein may be used as the first connection end of the electromagnetic apparatus to be connected to the first connection ends of all the first direct current modules, an output end of the second coil may be used as the second connection end of the electromagnetic apparatus to be connected to the moving contact or the fixed contact, an end that is of the moving iron core and that faces the second direct current module may be used as the third connection end of the electromagnetic apparatus to pass through the magnetic yoke and to be connected to the switch-off apparatus, and the moving iron core may trigger an action of the switch-off apparatus.

With reference to the fourth possible implementation of the first aspect, in a fifth possible implementation, the electromagnetic apparatus further includes a first magnetic pole and a second magnetic pole, the first magnetic pole may be a magnetic pole facing the first direct current module, and the second magnetic pole may be a magnetic pole facing the second direct current module. When the first magnetic pole is a south pole (an S pole), the second magnetic pole is a north pole (an N pole). On the contrary, when the first magnetic pole is an N pole, the second magnetic pole is an S pole. The moving iron core may be configured to move toward the second magnetic pole when the current flows from the second direct current module to each first direct current module and the amplitude of the current is greater than the preset amplitude, to trigger the switch-off apparatus to drive the moving contact to be separated from the fixed contact, so as to disconnect the loop between each first direct current module and the second direct current module. It can be understood that the moving iron core may move toward the second magnetic pole when the amplitude of the reverse current is greater than the preset amplitude, to implement overcurrent protection for the reverse current flowing to each first direct current module.

With reference to the fifth possible implementation of the first aspect, in a sixth possible implementation, the moving iron core is further configured to be located at the first magnetic pole when the current flows from each first direct current module to the second direct current module, to control the moving contact to keep connected to the fixed contact, so as to conduct the loop between each first direct current module and the second direct current module. It can be understood that the moving iron core does not trigger an action of the switch-off apparatus for the forward current, to conduct the loop between each first direct current module and the second direct current module.

With reference to any one of the first aspect to the sixth possible implementation of the first aspect, in a seventh possible implementation, the photovoltaic system further includes a direct current bus and a control module, and the first connection ends of all the first direct current modules are connected in parallel and then connected to the first connection end of the electromagnetic apparatus by using the direct current bus. The control module may be configured to collect a voltage of the direct current bus and a direct current of each first direct current module. The direct current herein may be a forward current or a reverse current. Further, the control module is further configured to: when the voltage is less than a preset voltage threshold and the direct current of each first direct current module is greater than a preset current threshold (which indicates that a current flowing through the electromagnetic apparatus is abnormal), control, based on the electromagnetic apparatus, the direct current switch-on/off apparatus to disconnect the loop between each first direct current module and the second direct current module. In the photovoltaic system provided in the embodiments, whether the current flowing through the electromagnetic apparatus is abnormal may be determined jointly by using the voltage of the direct current bus and the direct current of each first direct current module, to control, when the current flowing through the electromagnetic apparatus is abnormal, the direct current switch-on/off apparatus to disconnect the loop between each first direct current module and the second direct current module, so as to implement overcurrent protection for the forward current or the reverse current. In this way, overcurrent protection efficiency is higher.

With reference to any one of the first aspect to the sixth possible implementation of the first aspect, in an eighth possible implementation, each of the at least one first direct current module and the second direct current module may include a photovoltaic string, a direct current DC/DC conversion unit, a direct current bus, a direct current distribution unit, a load, or another direct current module.

With reference to any one of the first aspect to the sixth possible implementation of the first aspect, in a ninth possible implementation, the first direct current module includes a first photovoltaic string and a first DC/DC conversion unit, and the first photovoltaic string is connected in parallel to the first DC/DC conversion unit. The first DC/DC conversion unit may include a first output end and a second output end, the first output end of the first DC/DC conversion unit may be used as the first connection end of the first direct current module, and the second output end of the first DC/DC conversion unit may be used as the second connection end of the first direct current module.

With reference to the ninth possible implementation of the first aspect, in a tenth possible implementation, the first direct current module further includes a direct current bus, and the first photovoltaic string is connected in parallel to the first DC/DC conversion unit by using the direct current bus.

With reference to any one of the first aspect to the sixth possible implementation of the first aspect, in an eleventh possible implementation, the first direct current module includes a first DC/DC conversion unit and a first direct current distribution unit, and the first DC/DC conversion unit is connected in parallel to the first direct current distribution unit. The first direct current distribution unit may include a first output end and a second output end, the first output end of the first direct current distribution unit may be used as the first connection end of the first direct current module, and the second output end of the first direct current distribution unit may be used as the second connection end of the first direct current module.

With reference to the eleventh possible implementation of the first aspect, in a twelfth possible implementation, the first direct current module further includes a direct current bus, and the first DC/DC conversion unit is connected in parallel to the first direct current distribution unit by using the direct current bus.

With reference to any one of the first aspect to the sixth possible implementation of the first aspect, in a thirteenth possible implementation, the first direct current module includes a first photovoltaic string, a first DC/DC conversion unit, and a first direct current distribution unit, and the first photovoltaic string may be connected in parallel to the first direct current distribution unit by using the first DC/DC conversion unit. The first direct current distribution unit may include a first output end and a second output end, the first output end of the first direct current distribution unit may be used as the first connection end of the first direct current module, and the second output end of the first direct current distribution unit may be used as the second connection end of the first direct current module.

With reference to the thirteenth possible implementation of the first aspect, in a fourteenth possible implementation, the first direct current module further includes a direct current bus, the first photovoltaic string may be connected to an input end of the first DC/DC conversion unit by using the direct current bus, and an output end of the first DC/DC conversion unit may be connected to an input end of the first direct current distribution unit.

With reference to any one of the ninth possible implementation of the first aspect to the fourteenth possible implementation of the first aspect, in a fifteenth possible implementation, the second direct current module includes a second photovoltaic string and a second DC/DC conversion unit, and the second photovoltaic string is connected in parallel to the second DC/DC conversion unit. The second DC/DC conversion unit may include a first output end and a second output end, the first output end of the second DC/DC conversion unit may be used as the first connection end of the second direct current module, and the second output end of the second DC/DC conversion unit may be used as the second connection end of the second direct current module.

With reference to the fifteenth possible implementation of the first aspect, in a sixteenth possible implementation, the second direct current module further includes a direct current bus, and the second photovoltaic string may be connected in parallel to the second DC/DC conversion unit by using the direct current bus.

With reference to any one of the ninth possible implementation of the first aspect to the fourteenth possible implementation of the first aspect, in a seventeenth possible implementation, the second direct current module includes a second DC/DC conversion unit and a second direct current distribution unit, and the second DC/DC conversion unit is connected in parallel to the second direct current distribution unit. The second direct current distribution unit includes a first output end and a second output end, the first output end of the second direct current distribution unit may be used as the first connection end of the second direct current module, and the second output end of the second direct current distribution unit may be used as the second connection end of the second direct current module.

With reference to the seventeenth possible implementation of the first aspect, in an eighteenth possible implementation, the second direct current module further includes a direct current bus, and the second DC/DC conversion unit may be connected in parallel to the second direct current distribution unit by using the direct current bus.

With reference to any one of the ninth possible implementation of the first aspect to the fourteenth possible implementation of the first aspect, in a nineteenth possible implementation, the second direct current module includes a second photovoltaic string, a second DC/DC conversion unit, and a second direct current distribution unit, and the second photovoltaic string may be connected in parallel to the second direct current distribution unit by using the second DC/DC conversion unit. The second direct current distribution unit includes a first output end and a second output end, the first output end of the second direct current distribution unit is used as the first connection end of the second direct current module, and the second output end of the second direct current distribution unit is used as the second connection end of the second direct current module.

With reference to the nineteenth possible implementation of the first aspect, in a twentieth possible implementation, the second direct current module further includes a direct current bus, the second photovoltaic string may be connected to an input end of the second DC/DC conversion unit by using the direct current bus, and an output end of the second DC/DC conversion unit may be connected to an input end of the second direct current distribution unit.

With reference to any one of the first aspect to the sixth possible implementation of the first aspect, in a twenty-first possible implementation, the photovoltaic system further includes a direct current bus and a photovoltaic inverter, the third connection end of the second direct current module may be connected to the photovoltaic inverter by using the direct current bus, and an output end of the photovoltaic inverter may be connected to the load.

With reference to any one of the first aspect to the seventh possible implementation of the first aspect, in a twenty-second possible implementation, the photovoltaic system further includes a direct current combiner box and a direct current DC/AC (alternating current) conversion module, the third connection end of the second direct current module is connected to the DC/AC conversion module by using the direct current combiner box, and an output end of the DC/AC conversion module may be connected to a load.

According to a second aspect, the embodiments provide a direct current overcurrent protection apparatus. The direct current overcurrent protection apparatus is applicable to a photovoltaic system, the photovoltaic system further includes a first direct current module and a second direct current module, and the first direct current module is connected to the second direct current module by using the direct current overcurrent protection apparatus. The direct current overcurrent protection apparatus includes an electromagnetic apparatus and a direct current switch-on/off apparatus, a first connection end of the electromagnetic apparatus may be connected to the first direct current module, and a second connection end and a third connection end of the electromagnetic apparatus may be connected to the second direct current module by using the direct current switch-on/off apparatus. The electromagnetic apparatus herein may be configured to trigger an action of the direct current switch-on/off apparatus, and the direct current switch-on/off apparatus may be configured to conduct or disconnect a loop between the first direct current module and the second direct current module. When the photovoltaic system runs normally, a current (for example, a forward current) flows from the first direct current module to the second direct current module. In this case, the electromagnetic apparatus does not control the direct current switch-on/off apparatus to disconnect a loop between the first direct current module and the second direct current module, that is, the direct current overcurrent protection apparatus does not trigger overcurrent protection for the forward current in the loop. Optionally, when the first direct current module is faulty, the electromagnetic apparatus is further configured to: when a current (for example, a reverse current) flows from the second direct current module to the first direct current module and an amplitude of the current is greater than a preset amplitude, control the direct current switch-on/off apparatus to disconnect the loop between the first direct current module and the second direct current module, that is, the direct current overcurrent protection apparatus triggers overcurrent protection for the reverse current in the loop. In the embodiments, the electromagnetic apparatus may trigger the direct current switch-on/off apparatus to disconnect the loop between the first direct current module and the second direct current module, to implement unidirectional overcurrent protection for the reverse current in the loop.

With reference to the second aspect, in a first possible implementation, the direct current switch-on/off apparatus includes a switch-off apparatus (which may also be referred to as a tripping apparatus), a moving contact, and a fixed contact, the second connection end of the electromagnetic apparatus may be connected to the moving contact or the fixed contact, and the third connection end of the electromagnetic apparatus may be coupled to the moving contact and the fixed contact by using the switch-off apparatus. When the second connection end of the electromagnetic apparatus is connected to the moving contact, the fixed contact may be connected to the second direct current module. On the contrary, when the second connection end of the electromagnetic apparatus is connected to the fixed contact, the moving contact may be connected to the second direct current module. The electromagnetic apparatus may be configured to: when a current (for example, a reverse current) flows from the second direct current module to the first direct current module and the amplitude of the current is greater than the preset amplitude, trigger the switch-off apparatus to drive the moving contact to be separated from the fixed contact, so as to disconnect the loop between the first direct current module and the second direct current module. In the direct current overcurrent protection apparatus provided in the embodiments, when an amplitude of the reverse current is greater than the preset amplitude, the electromagnetic apparatus may trigger the switch-off apparatus to drive the moving contact to be separated from the fixed contact, to implement unidirectional overcurrent protection for the reverse current in the loop.

With reference to the first possible implementation of the second aspect, in a second possible implementation, the electromagnetic apparatus includes a magnetic yoke, a coil, a permanent magnet, a moving iron core, and a spring. The magnetic yoke may completely cover the coil, the permanent magnet, and a part that is of the moving iron core and that faces the first direct current module, and the magnetic yoke may partially cover a part that is of the moving iron core and that faces the second direct current module. The coil may be wound on the moving iron core, the permanent magnet is placed at an end that is of the moving iron core and that faces the first direct current module, an end that is of the moving iron core and that faces the second direct current module may be used as the third connection end of the electromagnetic apparatus to pass through the magnetic yoke and to be connected to the switch-off apparatus, the spring may wrap a part that is of the moving iron core and that passes through the magnetic yoke, an input end of the coil may be used as the first connection end of the electromagnetic apparatus to be connected to the first direct current module, and an output end of the coil may be used as the second connection end of the electromagnetic apparatus to be connected to the moving contact or the fixed contact. The moving iron core may be configured to be ejected in a direction of the switch-off apparatus when the current flows from the second direct current module to the first direct current module and the amplitude of the current is greater than the preset amplitude, to trigger the switch-off apparatus to drive the moving contact to be separated from the fixed contact (that is, the direct current overcurrent protection apparatus is in a switch-off state). In the direct current overcurrent protection apparatus provided in the embodiments, the moving iron core may be ejected in the direction of the switch-off apparatus when the amplitude of the reverse current is greater than the preset amplitude, to implement unidirectional overcurrent protection for the reverse current in the loop.

With reference to the second possible implementation of the second aspect, in a third possible implementation, the moving iron core is further configured to: when the current flows from the first direct current module to the second direct current module, keep a location relative to the permanent magnet unchanged, to control the moving contact to keep connected to the fixed contact, so as to conduct the loop between the first direct current module and the second direct current module. It can be understood that the moving iron core does not trigger an action of the switch-off apparatus for the forward current. In this case, the moving contact keeps connected to the fixed contact (that is, the direct current overcurrent protection apparatus is in a switch-on state), to conduct the loop between the first direct current module and the second direct current module.

With reference to the first possible implementation of the second aspect, in a fourth possible implementation, the electromagnetic apparatus includes a magnetic yoke, a first coil, a second coil, a first permanent magnet, a second permanent magnet, and a moving iron core. The magnetic yoke may completely cover the first coil, the second coil, the first permanent magnet, the second permanent magnet, and a part that is of the moving iron core and that faces the first direct current module, and the magnetic yoke may partially cover a part that is of the moving iron core and that faces the second direct current module. The first coil and the second coil may be wound on the moving iron core, a winding direction of the first coil is opposite to a winding direction of the second coil, the first coil and the second coil are connected in series, and the first permanent magnet and the second permanent magnet are placed between the first coil and the second coil. An input end of the first coil herein may be used as the first connection end of the electromagnetic apparatus to be connected to the first direct current module, an output end of the second coil may be used as the second connection end of the electromagnetic apparatus to be connected to the moving contact or the fixed contact, an end that is of the moving iron core and that faces the second direct current module may be used as the third connection end of the electromagnetic apparatus to pass through the magnetic yoke and to be connected to the switch-off apparatus, and the moving iron core may trigger an action of the switch-off apparatus.

With reference to the fourth possible implementation of the second aspect, in a fifth possible implementation, the electromagnetic apparatus further includes a first magnetic pole and a second magnetic pole, the first magnetic pole may be a magnetic pole facing the first direct current module, and the second magnetic pole may be a magnetic pole facing the second direct current module. When the first magnetic pole is a south pole (an S pole), the second magnetic pole is a north pole (an N pole). On the contrary, when the first magnetic pole is an N pole, the second magnetic pole is an S pole. The moving iron core may be configured to move toward the second magnetic pole when the current flows from the second direct current module to the first direct current module and the amplitude of the current is greater than the preset amplitude, to trigger the switch-off apparatus to drive the moving contact to be separated from the fixed contact, so as to disconnect the loop between the first direct current module and the second direct current module. It can be understood that the moving iron core may move toward the second magnetic pole when the amplitude of the reverse current is greater than the preset amplitude, to implement unidirectional overcurrent protection for the reverse current in the loop.

With reference to the fifth possible implementation of the second aspect, in a sixth possible implementation, the moving iron core is further configured to be located at the first magnetic pole when the current flows from the first direct current module to the second direct current module, to control the moving contact to keep connected to the fixed contact, so as to conduct the loop between the first direct current module and the second direct current module. It can be understood that the moving iron core does not trigger an action of the switch-off apparatus for the forward current. In this case, the moving contact keeps connected to the fixed contact (that is, the direct current switch-on/off apparatus is in a switch-on state), to conduct the loop between the first direct current module and the second direct current module.

In the embodiments, the electromagnetic apparatus may trigger the direct current switch-on/off apparatus to disconnect the loop between each first direct current module and the second direct current module, to implement overcurrent protection for the reverse current flowing to each first direct current module. In addition, a quantity of electromagnetic apparatuses and a quantity of direct current switch-on/off apparatuses in the photovoltaic system are reduced, costs are lower, and a system structure is simplified.

DETAILED DESCRIPTION OF EMBODIMENTS

A direct current overcurrent protection apparatus provided in the embodiments is applicable to a plurality of application fields, including a new energy smart microgrid field, a power transmission and distribution field, a new energy field (for example, a photovoltaic grid-connected field or a wind power grid-connected field), a photovoltaic power generation field (for example, power supply to a home device (for example, a refrigerator or an air conditioner) or a power grid), a wind power generation field, or a high-power converter field (for example, converting a direct current into a high-power high-voltage alternating current).

This may be determined based on an actual application scenario, and is not limited herein.

The direct current overcurrent protection apparatus provided in the embodiments is applicable to a photovoltaic system. The photovoltaic system further includes a first direct current module and a second direct current module, the first direct current module is connected to the second direct current module by using the direct current overcurrent protection apparatus, the direct current overcurrent protection apparatus includes an electromagnetic apparatus and a direct current switch-on/off apparatus, a first connection end of the electromagnetic apparatus may be connected to the first direct current module, and a second connection end and a third connection end of the electromagnetic apparatus may be connected to the second direct current module by using the direct current switch-on/off apparatus. When the photovoltaic system runs normally, a current (for example, a forward current) flows from the first direct current module to the second direct current module. In this case, the electromagnetic apparatus does not control the direct current switch-on/off apparatus to disconnect a loop between the first direct current module and the second direct current module. When the first direct current module is faulty, the electromagnetic apparatus is further configured to: when a current (for example, a reverse current) flows from the second direct current module to the first direct current module and an amplitude of the current is greater than a preset amplitude, control the direct current switch-on/off apparatus to disconnect the loop between the first direct current module and the second direct current module, to implement unidirectional overcurrent protection for the reverse current in the loop. In this way, a quantity of direct current overcurrent protection devices in the loop is reduced, and costs are lower. The direct current overcurrent protection apparatus provided in the embodiments may be adapted to different application scenarios, for example, a photovoltaic power supply scenario, a wind power supply scenario, an electric vehicle charging scenario, or another application scenario. The photovoltaic power supply scenario is used as an example below for description, and details are not described below.

Figure 1:
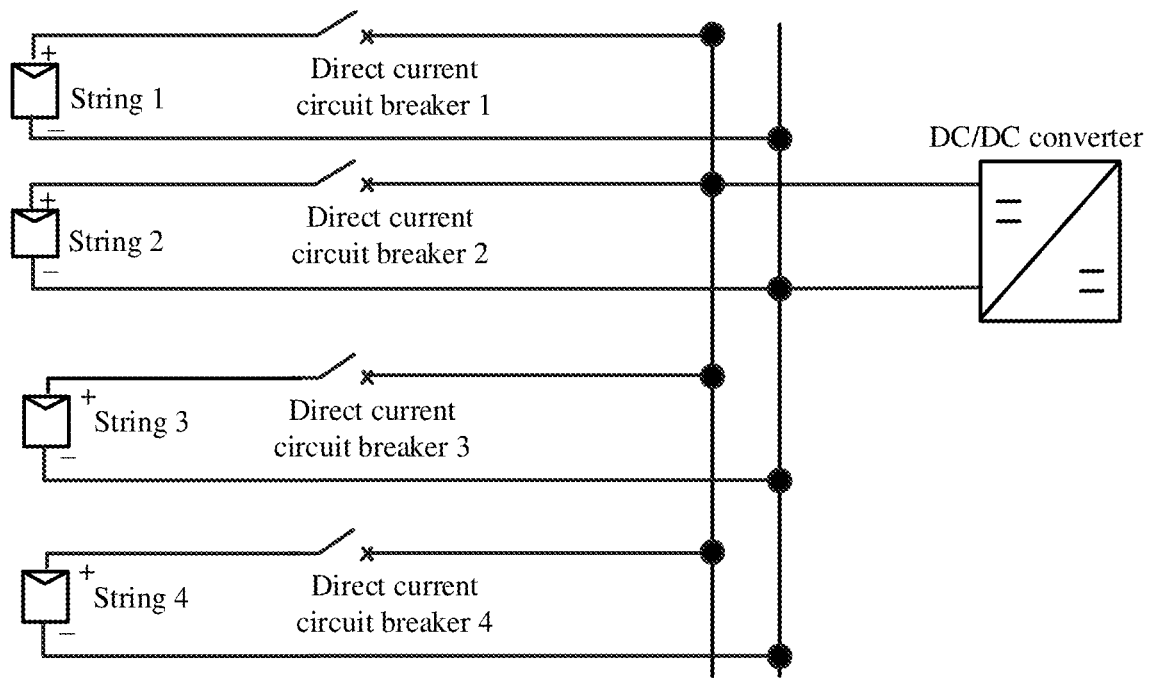
FIG. 1 is a schematic diagram of a structure in which a direct current circuit breaker is applied to a photovoltaic system.
Figure 2:
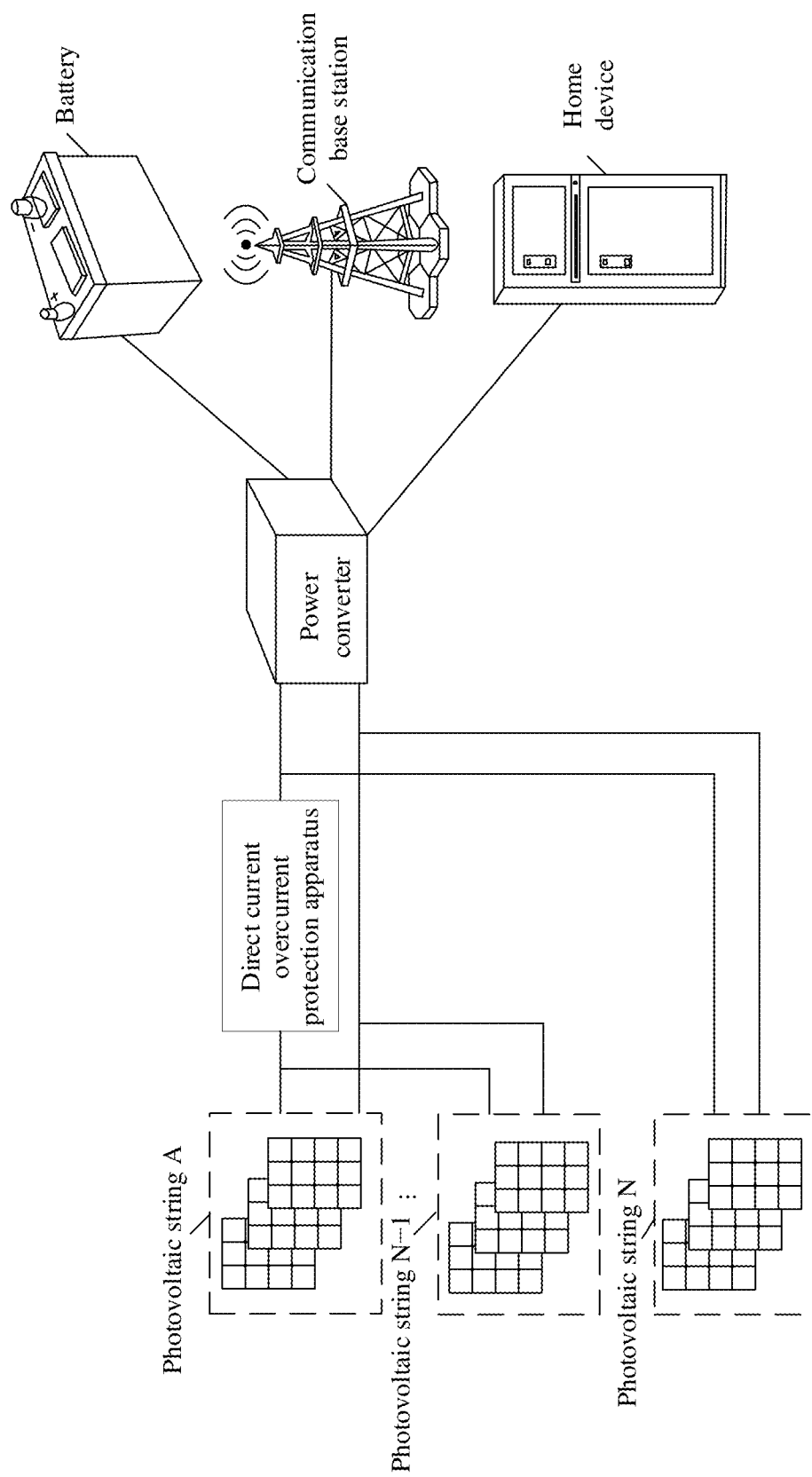
FIG. 2 is a schematic diagram of an application scenario of a direct current overcurrent protection apparatus.

FIG. 2 is a schematic diagram of an application scenario of a direct current overcurrent protection apparatus. In a photovoltaic power supply scenario, a first direct current module and a second direct current module each include a photovoltaic string. As shown in FIG. 2, a photovoltaic string A to a photovoltaic string N−1 each may be a photovoltaic string in the first direct current module (not shown in the figure), and a photovoltaic string N may be a photovoltaic string in the second direct current module (not shown in the figure). The photovoltaic string A to the photovoltaic string N−1 may be connected in parallel and then connected to a power converter by using the direct current overcurrent protection apparatus, and the photovoltaic string N is connected in parallel to the power converter. One of the photovoltaic string A to the photovoltaic string N may include a plurality of photovoltaic modules that are connected in series/parallel. The photovoltaic module herein may also be referred to as a solar panel or a photovoltaic panel. When the photovoltaic string A to the photovoltaic string N work normally, the direct current overcurrent protection apparatus is in a switch-on state, so that the photovoltaic string A to the photovoltaic string N are connected to the power converter. The photovoltaic string A to the photovoltaic string N may provide a direct current voltage for the power converter. The power converter may perform power conversion on the direct current voltage to obtain a target voltage, and supply power to a plurality of types of current-using devices such as a battery, a base station device (for example, a communication base station), and a home device based on the target voltage. When any photovoltaic string (for example, the photovoltaic string A) in the photovoltaic string A to the photovoltaic string N−1 is faulty, the photovoltaic string N outputs a backflow current (that is, a reverse current) to the photovoltaic string A by using the direct current overcurrent protection apparatus. The direct current overcurrent protection apparatus is in a switch-off state when an amplitude of the backflow current is greater than a preset amplitude, to disconnect a loop between the photovoltaic string N and each of the photovoltaic string A to the photovoltaic string N−1, so as to implement unidirectional overcurrent protection for the reverse current. In this way, damage to the photovoltaic string is avoided, and a quantity of direct current overcurrent protection apparatuses in a system is reduced, and costs are lower.

The following provides, with reference to FIG. 3 to FIG. 11, example descriptions of a direct current overcurrent protection apparatus, a photovoltaic system, and a working principle of the direct current overcurrent protection apparatus and the photovoltaic system that are provided in the embodiments.

Figure 3:
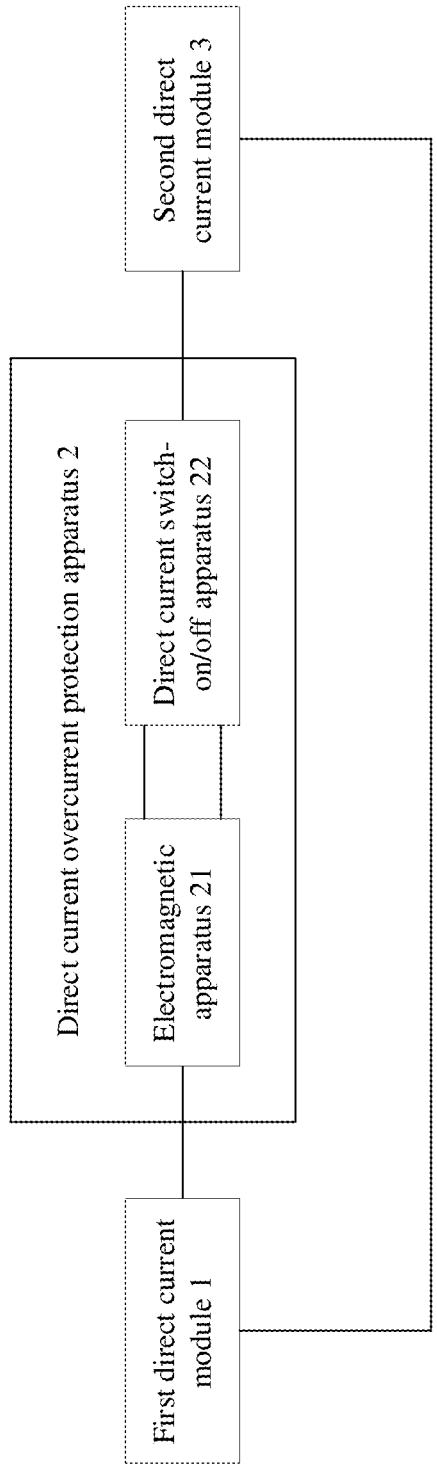
FIG. 3 is a schematic diagram of a structure of a direct current overcurrent protection apparatus.

FIG. 3 is a schematic diagram of a structure of a direct current overcurrent protection apparatus according to the embodiments. As shown in FIG. 3, a direct current overcurrent protection apparatus 2 (which may also be referred to as a direct current switch) is applicable to a photovoltaic system. The photovoltaic system further includes a first direct current module 1 and a second direct current module 3. The first direct current module 1 may be connected to the second direct current module 3 by using the direct current overcurrent protection apparatus 2. Each of the first direct current module 1 and the second direct current module 3 herein includes but is not limited to a photovoltaic string, a DC/DC conversion unit, a direct current bus, a load, or a direct current distribution unit. For example, the first direct current module 1 may be formed by connecting the photovoltaic string A to the photovoltaic string N−1 in parallel in FIG. 2, and the second direct current module 3 may include the photovoltaic string N in FIG. 2. The direct current overcurrent protection apparatus 2 includes an electromagnetic apparatus 21 and a direct current switch-on/off apparatus 22, a first connection end of the electromagnetic apparatus 21 may be connected to the first direct current module 1, and a second connection end and a third connection end of the electromagnetic apparatus 21 may be connected to the second direct current module 3 by using the direct current switch-on/off apparatus 22. The electromagnetic apparatus 21 herein may be configured to trigger an action of the direct current switch-on/off apparatus 22, and the direct current switch-on/off apparatus 22 may be configured to conduct or disconnect a loop between the first direct current module 1 and the second direct current module 3.

In some feasible implementations, when the photovoltaic system runs normally, a current (for example, a forward current) flows from the first direct current module 1 to the second direct current module 3. In this case, the electromagnetic apparatus 21 does not control the direct current switch-on/off apparatus 22 to disconnect the loop between the first direct current module 1 and the second direct current module 3, that is, the direct current overcurrent protection apparatus 2 is in a switch-on state and overcurrent protection is not triggered. The forward current herein may be a current marked by a user with "forward direction", or a current marked by a user with a reverse direction of "reverse direction". Optionally, when the first direct current module 1 is faulty, when a current (for example, a reverse current, that is, a current with a direction opposite to a current direction of the forward current) flows from the second direct current module 3 to the first direct current module 1 and an amplitude of the current is greater than a preset amplitude, the electromagnetic apparatus 21 may control the direct current switch-on/off apparatus 22 to disconnect the loop between the first direct current module 1 and the second direct current module 3. In this case, the direct current overcurrent protection apparatus 2 is in a switch-off state to trigger overcurrent protection. The reverse current may also be referred to as a negative current or a backflow current, and the reverse current may be a current marked by the user with a reverse direction of "forward direction", or a current marked by the user with "reverse direction". The preset amplitude herein may be an amplitude set by the user, or an amplitude configured by the direct current overcurrent protection apparatus for the first direct current module and the second direct current module. It can be understood that the direct current overcurrent protection apparatus 2 may implement unidirectional overcurrent protection for the reverse current in the loop, to avoid damaging the first direct current module or the second direct current module.

Figure 4:
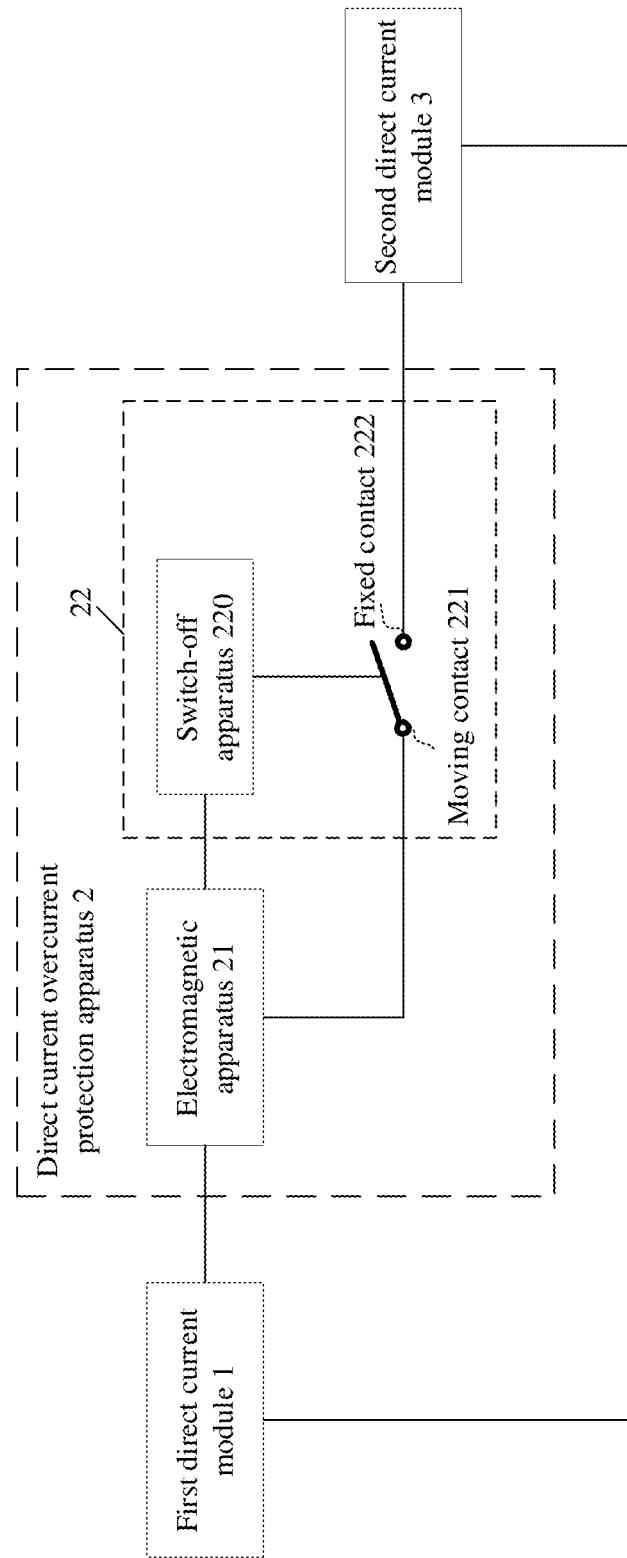
FIG. 4 is a schematic diagram of another structure of a direct current overcurrent protection apparatus.

In some implementations, FIG. 4 is a schematic diagram of another structure of a direct current overcurrent protection apparatus according to the embodiments. As shown in FIG. 4, the direct current switch-on/off apparatus 22 shown in FIG. 3 includes a switch-off apparatus 220 (which may also be referred to as a tripping apparatus), a moving contact 221, and a fixed contact 222, the second connection end of the electromagnetic apparatus 21 may be connected to the moving contact 221 or the fixed contact 222, and the third connection end of the electromagnetic apparatus 21 may be coupled to the moving contact 221 and the fixed contact 222 by using the switch-off apparatus 220. When the second connection end of the electromagnetic apparatus 21 is connected to the moving contact 221, the fixed contact 222 may be connected to the second direct current module 3. On the contrary, when the second connection end of the electromagnetic apparatus 21 is connected to the fixed contact 222, the moving contact 221 may be connected to the second direct current module 3. When the current flows from the second direct current module 3 to the first direct current module 1 and the amplitude of the current is greater than the preset amplitude, the electromagnetic apparatus 21 may trigger the switch-off apparatus 220 to drive the moving contact 221 to be separated from the fixed contact 222, to disconnect the loop between the first direct current module 1 and the second direct current module 3, so as to implement unidirectional overcurrent protection for the reverse current in the loop.

Figure 5:
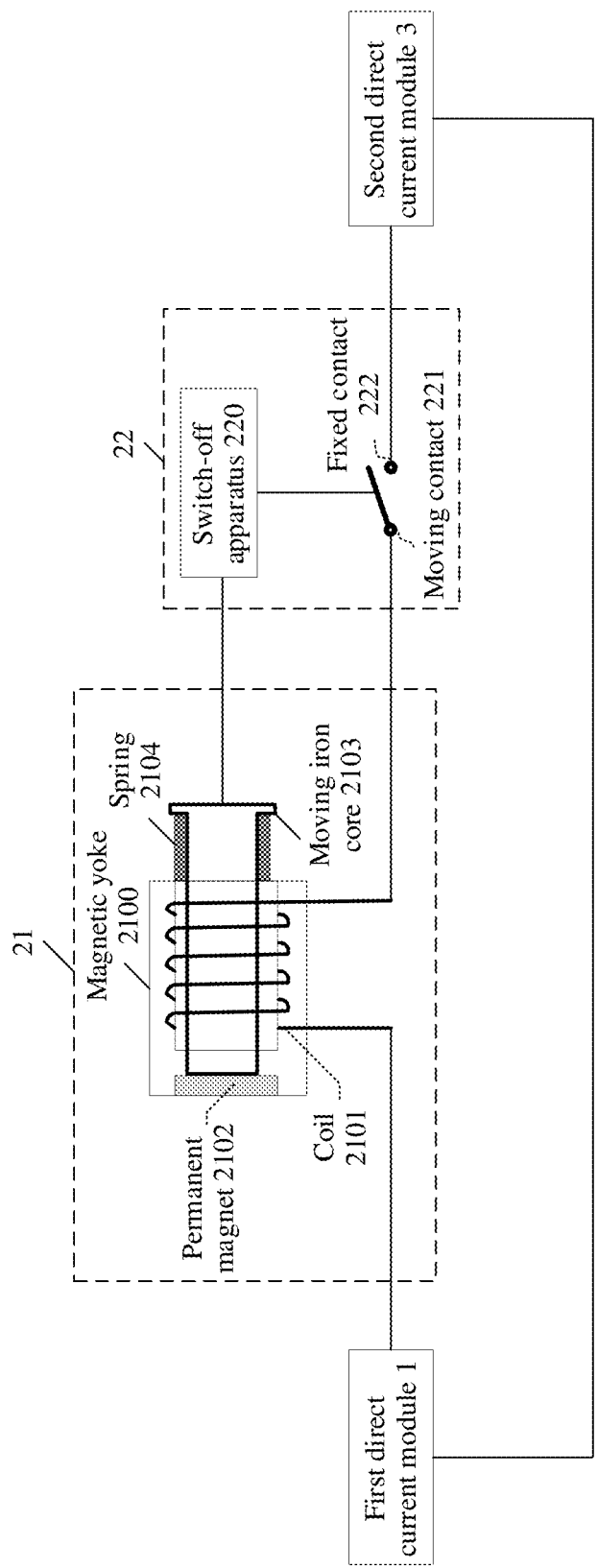
FIG. 5 is a schematic diagram of still another structure of a direct current overcurrent protection apparatus.

In some feasible implementations, FIG. 5 is a schematic diagram of still another structure of a direct current overcurrent protection apparatus according to the embodiments. As shown in FIG. 5, the electromagnetic apparatus 21 shown in FIG. 4 includes a magnetic yoke 2100, a coil 2101, a permanent magnet 2102, a moving iron core 2103, and a spring 2104. The electromagnetic apparatus 21 may be a single-coil solenoid electromagnet structure. The magnetic yoke herein may be a soft magnetic material that does not produce a magnetic field and only plays a role of magnetic line transmission in a magnetic circuit, for example, soft iron, A3 steel (an A-type steel), a soft magnetic alloy, or a ferrite material that each has high permeability. The magnetic yoke 2100 may completely cover the coil 2101, the permanent magnet 2102, and a part that is of the moving iron core 2103 and that faces the first direct current module 1, and the magnetic yoke 2100 may partially cover a part that is of the moving iron core 2103 and that faces the second direct current module 3. The coil 2101 may be wound on the moving iron core 2103, the permanent magnet 2102 is placed at an end that is of the moving iron core 2103 and that faces the first direct current module 1, an end that is of the moving iron core 2103 and that faces the second direct current module 3 may be used as the third connection end of the electromagnetic apparatus 21 to pass through the magnetic yoke 2100 and to be connected to the switch-off apparatus 220, the spring 2104 may wrap a part that is of the moving iron core 2103 and that passes through the magnetic yoke 2100, an input end of the coil 2101 may be used as the first connection end of the electromagnetic apparatus 21 to be connected to the first direct current module 1, and an output end of the coil 2101 may be used as the second connection end of the electromagnetic apparatus 21 to be connected to the moving contact 221 (or the fixed contact 222).

In some implementations, when both the first direct current module 1 and the second direct current module 3 work normally, and the current flows from the first direct current module 1 to the second direct current module 3, the moving iron core 2103 may keep a location relative to the permanent magnet 2102 unchanged, to control the moving contact 221 to keep connected to the fixed contact 222, so as to conduct the loop between the first direct current module 1 and the second direct current module 2. It can be understood that, when the current flows from the first direct current module 1 to the second direct current module 3 (that is, the current is a forward current), a magnetic field generated by the coil 2101 and a magnetic field of the permanent magnet 2102 have a same direction, the magnetic field generated by the coil 2101 strengthens the magnetic field of the permanent magnet 2102, a force of attraction of the permanent magnet 2102 for the moving iron core 2103 increases, and a force of attraction of the permanent magnet 2102 for the moving iron core 2103 is greater than a reaction force of the spring 2104. In this case, the spring 2104 is in a compressed state, and an air gap between the permanent magnet 2102 and the moving iron core 2103 is close to zero. Therefore, the moving iron core 2103 does not trigger an action of the switch-off apparatus 220 (that is, the moving contact 221 keeps connected to the fixed contact 222). In this case, the direct current overcurrent protection apparatus 2 is in a switch-on state, and does not trigger overcurrent protection for the forward current.

In some implementations, when the first direct current module 1 is faulty, the moving iron core 2103 may be ejected in a direction of the switch-off apparatus 220 when the current flows from the second direct current module 3 to the first direct current module 1 and the amplitude of the current is greater than the preset amplitude, to trigger the switch-off apparatus 220 to drive the moving contact 221 to be separated from the fixed contact 222, so as to disconnect the loop between the first direct current module 1 and the second direct current module 3. It can be understood that, when the current flows from the second direct current module 3 to the first direct current module 1 (that is, the current is a reverse current), the magnetic field generated by the coil 2101 and the magnetic field of the permanent magnet 2102 have opposite directions, the magnetic field generated by the coil 2101 weakens the magnetic field of the permanent magnet 2102, and the force of attraction of the permanent magnet 2102 for the moving iron core 2103 is reduced. When the amplitude of the reverse current is greater than the preset amplitude, the force of attraction of the permanent magnet 2102 for the moving iron core 2103 is less than the reaction force of the spring 2104. In this case, the moving iron core 2103 is ejected in the direction of the switch-off apparatus 220, to trigger the switch-off apparatus 220 to drive the moving contact 221 to be separated from the fixed contact 222, so that the direct current overcurrent protection apparatus 2 is in the switch-off state, and unidirectional overcurrent protection for the reverse current is implemented.

Figure 6:
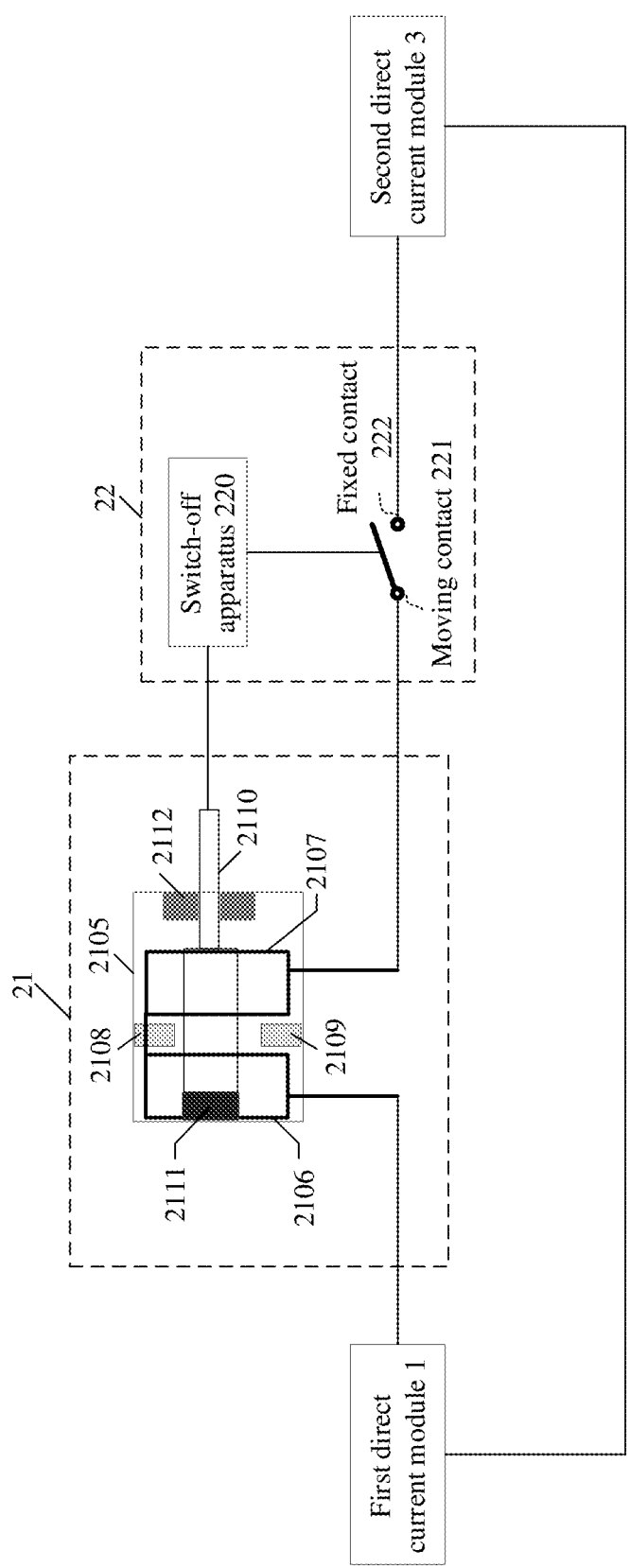
FIG. 6 is a schematic diagram of yet another structure of a direct current overcurrent protection apparatus.

Optionally, in some implementations, FIG. 6 is a schematic diagram of yet another structure of a direct current overcurrent protection apparatus according to the embodiments. As shown in FIG. 6, the electromagnetic apparatus 21 shown in FIG. 4 includes a magnetic yoke 2105, a first coil 2106, a second coil 2107, a first permanent magnet 2108, a second permanent magnet 2109, and a moving iron core 2110. The electromagnetic apparatus 21 may be a double-coil solenoid electromagnet structure. The magnetic yoke 2105 may completely cover the first coil 2106, the second coil 2107, the first permanent magnet 2108, the second permanent magnet 2109, and a part that is of the moving iron core 2110 and that faces the first direct current module 1, and the magnetic yoke 2105 may partially cover a part that is of the moving iron core 2110 and that faces the second direct current module 3, the first coil 2106 and the second coil 2107 may be wound on the moving iron core 2110, a winding direction of the first coil 2106 is opposite to a winding direction of the second coil 2107, the first coil 2106 and the second coil 2107 are connected in series, and a first permanent magnet 2108 and a second permanent magnet 2109 are placed between the first coil 2106 and the second coil 2107. When the winding direction of the first coil 2106 is clockwise, the winding direction of the second coil 2107 is counterclockwise. On the contrary, when the winding direction of the first coil 2106 is counterclockwise, the winding direction of the second coil 2107 is clockwise. An input end of the first coil 2106 herein may be used as the first connection end of the electromagnetic apparatus 21 to be connected to the first direct current module 1, an output end of the second coil 2107 may be used as the second connection end of the electromagnetic apparatus 21 to be connected to the moving contact 221 or the fixed contact 222, an end that is of the moving iron core 2110 and that faces the second direct current module 3 may be used as the third connection end of the electromagnetic apparatus 21 to pass through the magnetic yoke 2105 and to be connected to the switch-off apparatus 220, and the moving iron core 2110 may trigger an action of the switch-off apparatus 220.

In some feasible implementations, as shown in FIG. 6, the electromagnetic apparatus 21 further includes a first magnetic pole 2111 and a second magnetic pole 2112, the first magnetic pole 2111 may be a magnetic pole facing the first direct current module 1, and the second magnetic pole 2112 may be a magnetic pole facing the second direct current module 3. The first magnetic pole 2111 and the second magnetic pole 2112 herein may be two magnetic poles formed after the magnetic yoke 2105 contacts the first permanent magnet 2108 and the second permanent magnet 2109. When the first magnetic pole 2111 is a south pole (an S pole), the second magnetic pole 2112 is a north pole (an N pole). On the contrary, when the first magnetic pole 2111 is an N pole, the second magnetic pole 2112 is an S pole. When both the first direct current module 1 and the second direct current module 3 work normally, the moving iron core 2110 may be located at the first magnetic pole 2111 when the current flows from the first direct current module 1 to the second direct current module 3, to control the moving contact 221 to keep connected to the fixed contact 222, so as to conduct the loop between the first direct current module 1 and the second direct current module 3. It can be understood that, when the current flows from the first direct current module 1 to the second direct current module 3 (that is, the current is a forward current), a magnetic field generated by the first coil 2106 and a magnetic field generated by the second coil 2107 have opposite directions, the magnetic field generated by the first coil 2106 strengthens a magnetic field on a left side of the first permanent magnet 2108 and the second permanent magnet 2109, and the magnetic field generated by the second coil 2107 weakens a magnetic field on a right side of the first permanent magnet 2108 and the second permanent magnet 2109. In this case, the moving iron core 2110 is located at the first magnetic pole 2111 and does not trigger an action of the switch-off apparatus 220 (that is, the moving contact 221 keeps connected to the fixed contact 222). In this case, the direct current overcurrent protection apparatus 2 is in the switch-on state, and overcurrent protection for the forward current is not triggered.

In some feasible implementations, when the first direct current module 1 is faulty, the moving iron core 2110 may move toward the second magnetic pole 2112 when the current flows from the second direct current module 3 to the first direct current module 1 and the amplitude of the current is greater than the preset amplitude, to trigger the switch-off apparatus 220 to drive the moving contact 221 to be separated from the fixed contact 222, so as to disconnect the loop between the first direct current module 1 and the second direct current module 3. It can be understood that, when the current flows from the second direct current module 3 to the first direct current module 1 (that is, the current is a reverse current), the magnetic field generated by the first coil 2106 and the magnetic field generated by the second coil 2107 have opposite directions, the magnetic field generated by the first coil 2106 weakens the magnetic field on the left side of the first permanent magnet 2108 and the second permanent magnet 2109, and the magnetic field generated by the second coil 2107 strengthens the magnetic field on the right side of the first permanent magnet 2108 and the second permanent magnet 2109. When the amplitude of the reverse current is greater than the preset amplitude, the moving iron core 2110 moves toward the second magnetic pole 2112, to trigger the switch-off apparatus 220 to drive the moving contact 221 to be separated from the fixed contact 222, so that the direct current overcurrent protection apparatus 2 is in the switch-off state, and unidirectional overcurrent protection for the reverse current is implemented.

Figure 7:
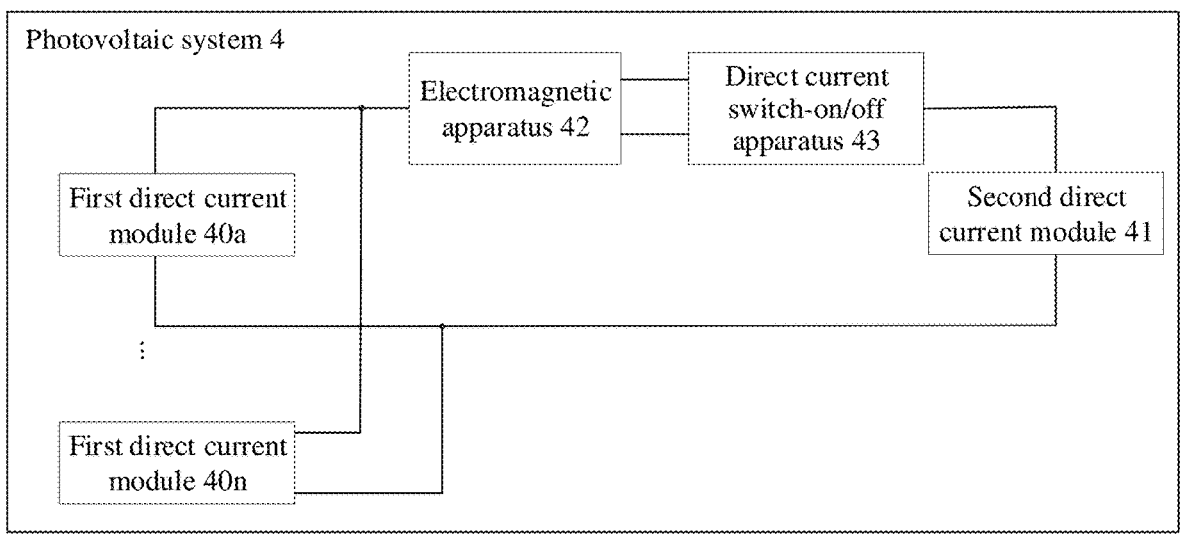
FIG. 7 is a schematic diagram of a structure of a photovoltaic system.

Further, FIG. 7 is a schematic diagram of a structure of a photovoltaic system according to the embodiments. As shown in FIG. 7, a photovoltaic system 4 includes at least one first direct current module (for example, a first direct current module 40*a* to a first direct current module 40*n*), a second direct current module 41, an electromagnetic apparatus 42, and a direct current switch-on/off apparatus 43. The electromagnetic apparatus 42 and the direct current switch-on/off apparatus 43 herein may form a direct current overcurrent protection apparatus. First connection ends of all first direct current modules in the first direct current module 40*a* to the first direct current module 40*n* may be connected in parallel and then connected to a first connection end of the electromagnetic apparatus 42, a second connection end and a third connection end of the electromagnetic apparatus 42 may be connected to a first connection end of the second direct current module 41 by using the direct current switch-on/off apparatus 43, and second connection ends of all the first direct current modules may be connected in parallel and then connected to a second connection end of the second direct current module 41. When the first connection end of each first direct current module is a positive electrode, the second connection end of each first direct current module is a negative electrode; or when the first connection end of each first direct current module is a negative electrode, the second connection end of each first direct current module is a positive electrode. When the first connection end of the second direct current module 41 is a positive electrode, the second connection end of the second direct current module 41 is a negative electrode; or when the first connection end of the second direct current module 41 is a negative electrode, the second connection end of the second direct current module 41 is a positive electrode. Each of the first direct current module 40a to the first direct current module 40n and the second direct current module 41 may include but is not limited to a photovoltaic string, a DC/DC conversion unit, a direct current bus, a load, or a direct current distribution unit. The direct current distribution unit herein may be understood as a middle apparatus between a rectifier, a photovoltaic string, and a load in the photovoltaic system, and the direct current distribution unit has functions of circuit conversion, protection, control, measurement, and alarm signal sending. Optionally, the photovoltaic system 4 may alternatively include a plurality of second direct current modules, a plurality of electromagnetic apparatuses, and a plurality of direct current switch-on/off apparatuses. This may be determined based on an actual application scenario, and is not limited herein.

In some implementations, when the photovoltaic system 4 runs normally, a current (for example, a forward current) flows from each first direct current module in the first direct current module 40a to the first direct current module 40n to the second direct current module 41. In this case, the electromagnetic apparatus 42 does not control the direct current switch-on/off apparatus 43 to disconnect a loop between each first direct current module and the second direct current module 41. When any first direct current module is faulty, when a current (for example, a reverse current) flows from the second direct current module 41 to each first direct current module in the first direct current module 40a to the first direct current module 40n and an amplitude of the current is greater than a preset amplitude, the electromagnetic apparatus 42 may control the direct current switch-on/off apparatus 43 to disconnect the loop between each first direct current module and the second direct current module 41, to implement overcurrent protection for the reverse current flowing to each first direct current module.

In some implementations, for specific structures of the electromagnetic apparatus 42 and the direct current switch-on/off apparatus 43, refer to specific structures of the electromagnetic apparatus 21 and the direct current switch-on/off apparatus 22 in the direct current overcurrent protection apparatus 1 in FIG. 3 to FIG. 6. Details are not described herein again. It is assumed that the specific structures of the electromagnetic apparatus 42 and the direct current switch-on/off apparatus 43 are the same as specific structures of the electromagnetic apparatus 21 and the direct current switch-on/off apparatus 22 in FIG. 4. When the current (for example, a reverse current) flows from the second direct current module 41 to each first direct current module in the first direct current module 40a to the first direct current module 40n and the amplitude of the current is greater than the preset amplitude, the electromagnetic apparatus 42 triggers a switch-off apparatus (for example, the switch-off apparatus 220) to drive a moving contact (for example, the moving contact 221) to be separated from a fixed contact (for example, the fixed contact 222), to disconnect the loop between each first direct current module and the second direct current module 41. It is assumed that the specific structures of the electromagnetic apparatus 42 and the direct current switch-on/off apparatus 43 are the same as specific structures of the electromagnetic apparatus 21 and the direct current switch-on/off apparatus 22 in FIG. 5, and a moving iron core (for example, the moving iron core 2103) may be ejected in the direction of the switch-off apparatus (for example, the switch-off apparatus 220) when the current flows from the second direct current module 41 to each first direct current module and the amplitude of the current is greater than the preset amplitude, to trigger the switch-off apparatus to drive the moving contact (for example, the moving contact 221) to be separated from the fixed contact (for example, the fixed contact 222), so as to disconnect the loop between each first direct current module and the second direct current module 41. The moving iron core may further keep a location relative to a permanent magnet (for example, the permanent magnet 2102) unchanged when the current flows from each first direct current module to the second direct current module 41, to control the moving contact to keep connected to the fixed contact, so as to conduct the loop between each first direct current module and the second direct current module 41.

In some implementations, it is assumed that the specific structures of the electromagnetic apparatus 42 and the direct current switch-on/off apparatus 43 are the same as specific structures of the electromagnetic apparatus 21 and the direct current switch-on/off apparatus 22 in FIG. 6, and a moving iron core (for example, the moving iron core 2110) moves toward a second magnetic pole (for example, the second magnetic pole 2112) when the current flows from the second direct current module 41 to each first direct current module and the amplitude of the current is greater than the preset amplitude, to trigger a switch-off apparatus (for example, the switch-off apparatus 220) to drive a moving contact (for example, the moving contact 221) to be separated from a fixed contact (for example, the fixed contact 222), so as to disconnect the loop between each first direct current module and the second direct current module 41. The moving iron core may alternatively be located at a first magnetic pole (for example, the first magnetic pole 2111) when the current flows from each first direct current module to the second direct current module 41, to control the moving contact to keep connected to the fixed contact, so as to conduct the loop between each first direct current module and the second direct current module 41.

Figure 8:
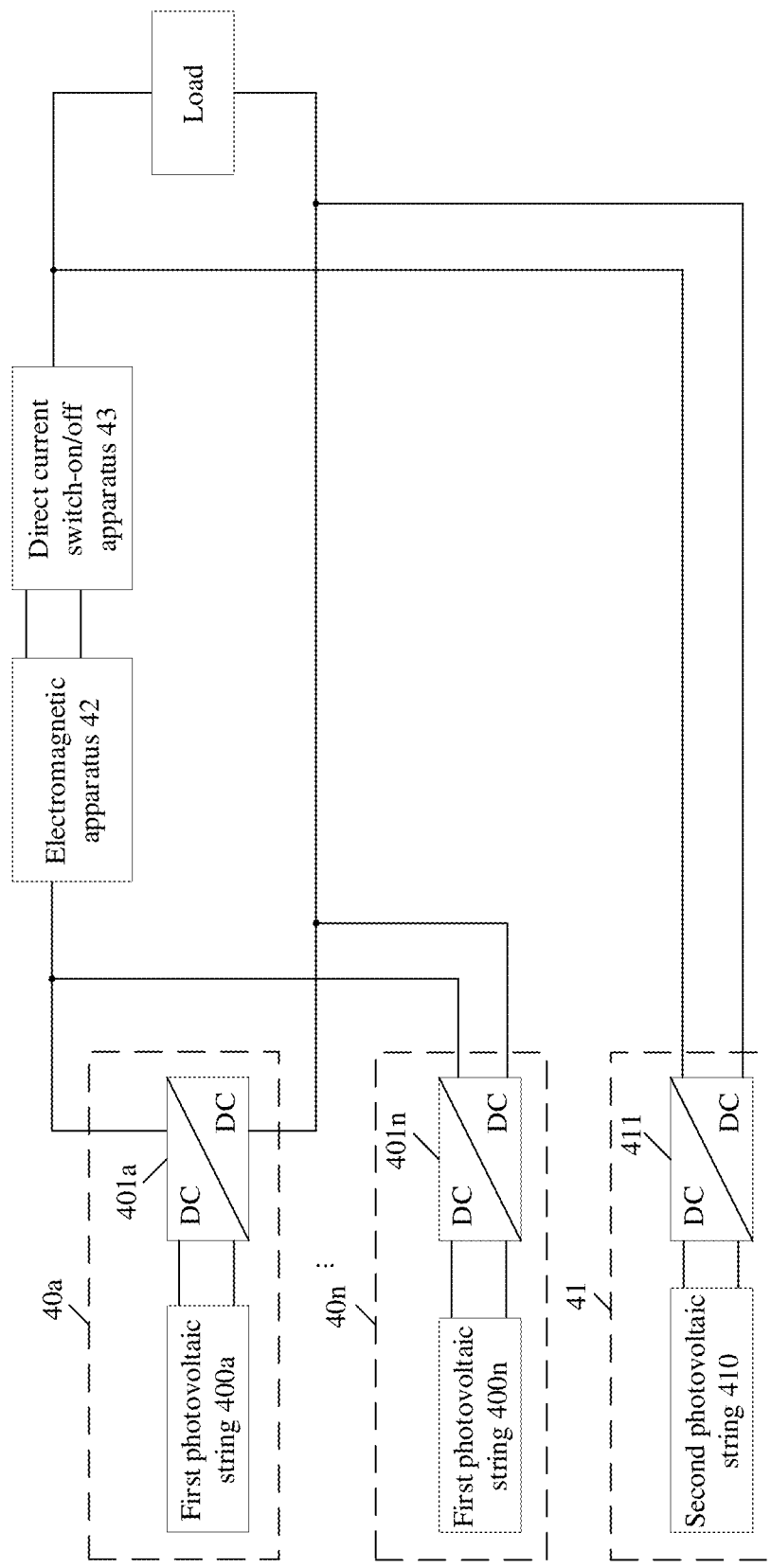
FIG. 8 is a schematic diagram of another structure of a photovoltaic system.

In some implementations, one of the first direct current module 40a to the first direct current module 40n and the second direct current module 41 may include a photovoltaic string and a DC/DC conversion unit, or one direct current module includes a photovoltaic string, a direct current bus, and a DC/DC conversion unit. FIG. 8 is a schematic diagram of another structure of a photovoltaic system according to the embodiments. As shown in FIG. 8, the first direct current module 40a shown in FIG. 7 includes a first photovoltaic string 400a and a first DC/DC conversion unit 401a, and the first photovoltaic string 400a is connected in parallel to the first DC/DC conversion unit 401a. Optionally, the first direct current module 40a may further include a direct current bus, and the first photovoltaic string 400a may be connected in parallel to the first DC/DC conversion unit 401a by using the direct current bus. The first DC/DC conversion unit 401a may include a first output end and a second output end, the first output end of the first DC/DC conversion unit 401a may be used as the first connection end of the first direct current module 40a, and the second output end of the first DC/DC conversion unit 401a may be used as the second connection end of the first direct current module 40a, and so on. The first direct current module 40n includes a first photovoltaic string 400n and a first DC/DC conversion unit 401n, and the first photovoltaic string 400n is connected in parallel to the first DC/DC conversion unit 401n. Optionally, the first direct current module 40n may further include a direct current bus, and the first photovoltaic string 400n may be connected in parallel to the first DC/DC conversion unit 401n by using the direct current bus. The first DC/DC conversion unit 401n may include a first output end and a second output end, the first output end of the first DC/DC conversion unit 401n may be used as the first connection end of the first direct current module 40n, and the second output end of the first DC/DC conversion unit 401n may be used as the second connection end of the first direct current module 40n. The second direct current module 41 includes a second photovoltaic string 410 and a second DC/DC conversion unit 411, and the second photovoltaic string 410 is connected in parallel to the second DC/DC conversion unit 411. Optionally, the second direct current module 41 may further include a direct current bus, and the second photovoltaic string 410 may be connected in parallel to the second DC/DC conversion unit 411 by using the direct current bus. The second DC/DC conversion unit 411 may include a first output end and a second output end, the first output end of the second DC/DC conversion unit 411 may be used as the first connection end of the second direct current module 41, the second output end of the second DC/DC conversion unit 411 may be used as the second connection end of the second direct current module 41, and the first output end and the second output end of the second DC/DC conversion unit 411 may be connected to a load to supply power to the load.

Figure 9:
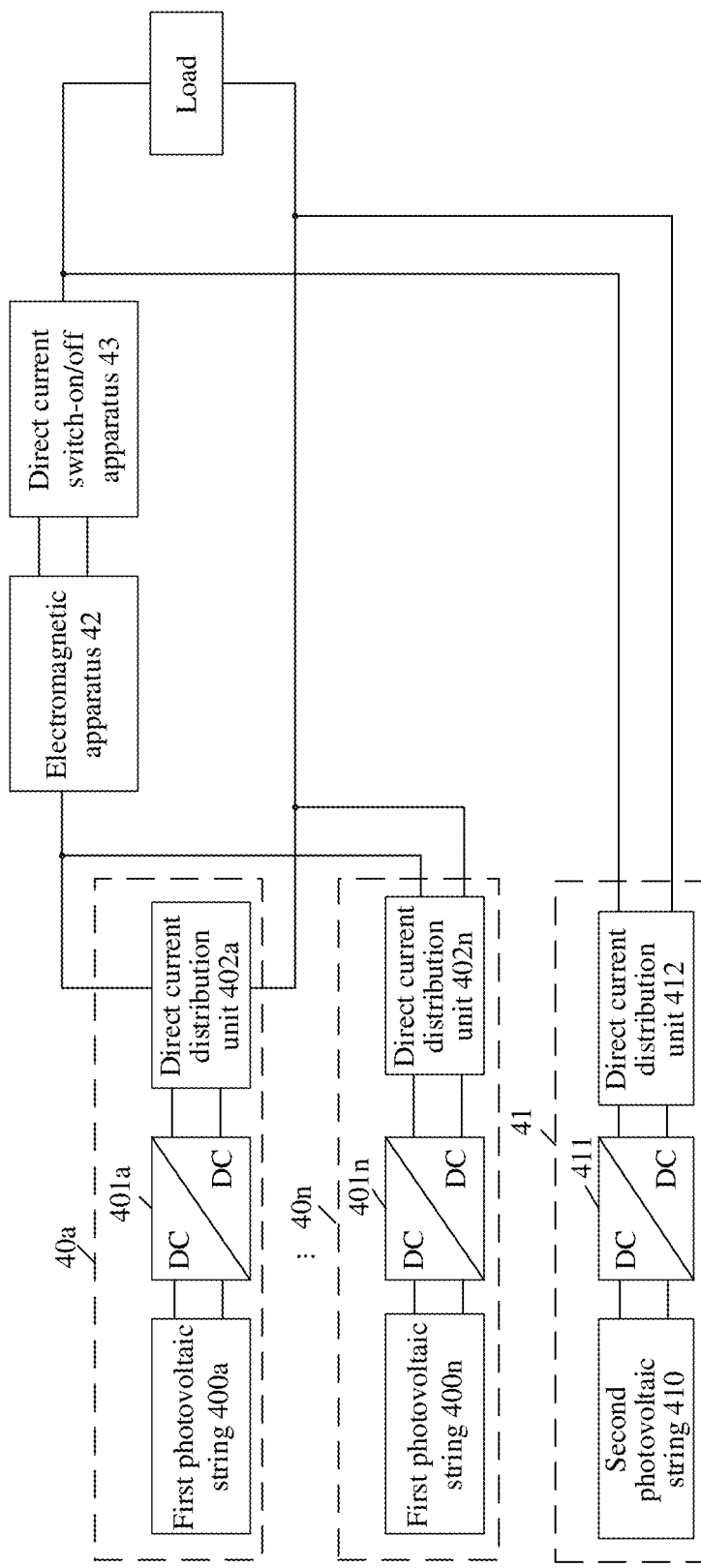
FIG. 9 is a schematic diagram of still another structure of a photovoltaic system.

In some implementations, one of the first direct current module 40a to the first direct current module 40n and the second direct current module 41 may include a photovoltaic string, a DC/DC conversion unit, and a direct current distribution unit, or one direct current module includes a photovoltaic string, a direct current bus, a DC/DC conversion unit, and a direct current distribution unit. This may be determined based on an actual application scenario, and is not limited herein. FIG. 9 is a schematic diagram of still another structure of a photovoltaic system according to the embodiments. As shown in FIG. 9, the first direct current module 40a shown in FIG. 7 includes a first photovoltaic string 400a, a first DC/DC conversion unit 401a, and a first direct current distribution unit 402a, and the first photovoltaic string 400a may be connected in parallel to the first direct current distribution unit 402a by using the first DC/DC conversion unit 401a. Optionally, the first direct current module 40a further includes a direct current bus, the first photovoltaic string 400a may be connected to an input end of the first DC/DC conversion unit 401a by using the direct current bus, and an output end of the first DC/DC conversion unit 401a may be connected to an input end of the first direct current distribution unit 402a. The first direct current distribution unit 402a may include a first output end and a second output end, the first output end of the first direct current distribution unit 402a may be used as the first connection end of the first direct current module 40a, and the second output end of the first direct current distribution unit 402a may be used as the second connection end of the first direct current module 40a, and so on. The first direct current module 40n includes a first photovoltaic string 400n, a first DC/DC conversion unit 401n, and a first direct current distribution unit 402n, and the first photovoltaic string 400n may be connected in parallel to the first direct current distribution unit 402n by using the first DC/DC conversion unit 401n. Optionally, the first direct current module 40n further includes a direct current bus, the first photovoltaic string 400n may be connected to an input end of the first DC/DC conversion unit 401n by using the direct current bus, and an output end of the first DC/DC conversion unit 401n may be connected to an input end of the first direct current distribution unit 402n. The first direct current distribution unit 402n may include a first output end and a second output end, the first output end of the first direct current distribution unit 402n may be used as the first connection end of the first direct current module 40n, and the second output end of the first direct current distribution unit 402n may be used as the second connection end of the first direct current module 40n.

As shown in FIG. 9, the second direct current module 41 includes a second photovoltaic string 410, a second DC/DC conversion unit 411, and a second direct current distribution unit 412, and the second photovoltaic string 410 may be connected in parallel to the second direct current distribution unit 412 by using the second DC/DC conversion unit 411. Optionally, the second direct current module 41 further includes a direct current bus, the second photovoltaic string 410 may be connected to an input end of the second DC/DC conversion unit 411 by using the direct current bus, and an output end of the second DC/DC conversion unit 411 may be connected to an input end of the second direct current distribution unit 412. The second direct current distribution unit 412 may include a first output end and a second output end, the second output end of the second direct current distribution unit 412 may be used as the first connection end of the second direct current module 41, the second output end of the second direct current distribution unit 412 may be used as the second connection end of the second direct current module 41, and the first output end and the second output end of the second DC/DC conversion unit 411 may be connected to a load to supply power to the load.

Optionally, in some implementations, one of the first direct current module 40a to the first direct current module 40n and the second direct current module 41 may include a DC/DC conversion unit and a direct current distribution unit, or one direct current module includes a DC/DC conversion unit, a direct current bus, and a direct current distribution unit. This may be determined based on an actual application scenario, and is not limited herein. For ease of description, the following provides descriptions by using the first direct current module 40a and the second direct current module 41 as an example. The first direct current module 40a may include a first DC/DC conversion unit 401a and a first direct current distribution unit 402a, and the first DC/DC conversion unit 401a is connected in parallel to the first direct current distribution unit 402a. Optionally, the first direct current module 40a may further include a direct current bus, and the first DC/DC conversion unit 401a is connected in parallel to the first direct current distribution unit 402a by using the direct current bus. The first direct current distribution unit 402a may include a first output end and a second output end, the first output end of the first direct current distribution unit 402a may be used as the first connection end of the first direct current module 40a, and the second output end of the first direct current distribution unit 402a may be used as the second connection end of the first direct current module 40a. The second direct current module 41 includes a second DC/DC conversion unit 411 and a second direct current distribution unit 412, and the second DC/DC conversion unit 411 is connected in parallel to the second direct current distribution unit 412. Optionally, the second direct current module 41 further includes a direct current bus, and the second DC/DC conversion unit 411 may be connected in parallel to the second direct current distribution unit 412 by using the direct current bus. The second direct current distribution unit 412 includes a first output end and a second output end, the first output end of the second direct current distribution unit 412 may be used as the first connection end of the second direct current module 41, the second output end of the second direct current distribution unit 412 may be used as the second connection end of the second direct current module 41, and the first output end and the second output end of the second DC/DC conversion unit 411 may be connected to a load to supply power to the load.

Figure 10:
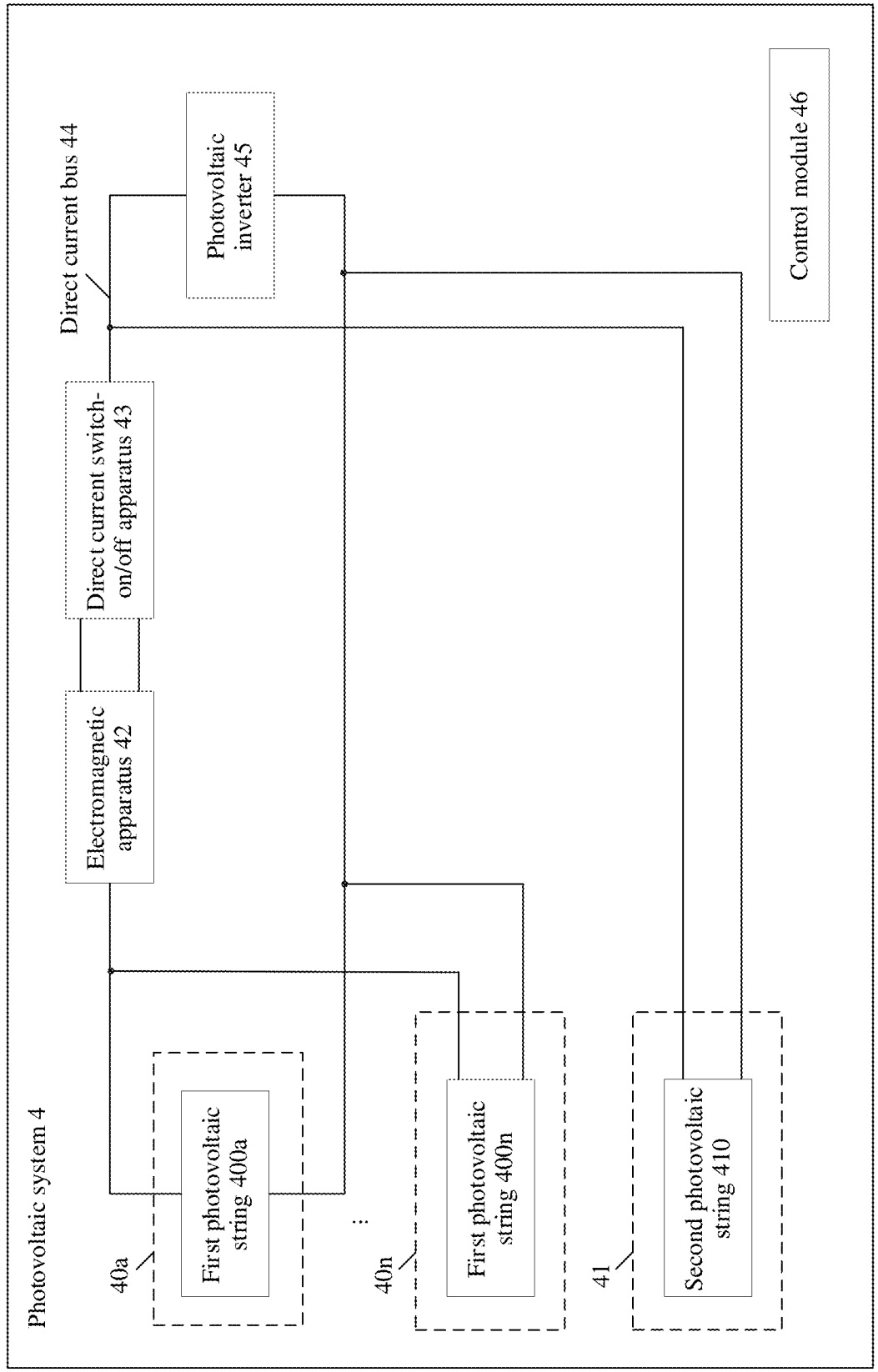
FIG. 10 is a schematic diagram of yet another structure of a photovoltaic system.

In some implementations, FIG. 10 is a schematic diagram of yet another structure of a photovoltaic system according to the embodiments. As shown in FIG. 10, the photovoltaic system 4 shown in FIG. 7 may further include a direct current bus 44 and a control module 46. The direct current bus 44 herein may alternatively be located between the first direct current module 40*a* and the electromagnetic apparatus 42. This indicates that first connection ends of all the first direct current modules in the first direct current module 40*a* to the first direct current module 40*n* may be connected in parallel and then connected to the first connection end of the electromagnetic apparatus 42 by using the direct current bus 44. Optionally, the control module 46 may alternatively be integrated into the first direct current module. This may be determined based on an actual application scenario, and is not limited herein. The control module 46 may collect a voltage of the direct current bus 44 and a direct current of each first direct current module in the first direct current module 40*a* to the first direct current module 40*n* in real time. Further, when the voltage is less than a preset voltage threshold and the direct current of each first direct current module is greater than a preset current threshold (which indicates that a current flowing through the electromagnetic apparatus 42 is abnormal), the control module 46 may control, based on the electromagnetic apparatus 42, the direct current switch-on/off apparatus 43 to disconnect the loop between each first direct current module and the second direct current module 41. The preset voltage threshold and the preset current threshold herein may be thresholds specified by a user, or thresholds configured by the photovoltaic system for each first direct current module and the second direct current module. The direct current herein may be a current (for example, a forward current or a reverse current) marked by the user with "positive direction". Therefore, bidirectional overcurrent protection for the forward current and the reverse current can be implemented. When the voltage is greater than the preset voltage threshold and the direct current is less than the preset current threshold (which indicates that the current flowing through the electromagnetic apparatus 42 is normal), the control module 46 does not control, based on the electromagnetic apparatus 42, the direct current switch-on/off apparatus 43 to disconnect the loop between each first direct current module and the second direct current module 41. That is, the loop between each first direct current module and the second direct current module 41 is conducted.

In some feasible implementations, as shown in FIG. 10, the photovoltaic system 4 further includes a photovoltaic inverter 45, the third connection end of the second direct current module 41 may be connected to the photovoltaic inverter 45 by using the direct current bus 44, and an output end of the photovoltaic inverter 45 may be connected to a load. Each of the first direct current module 40*a* to the first direct current module 40*n* and the second direct current module 41 includes a photovoltaic string. For example, as shown in FIG. 10, the first direct current module 40*a* includes a first photovoltaic string 400*a*, . . . , the first direct current module 40*n* includes a first photovoltaic string 400*n*, and the second direct current module 41 includes a second photovoltaic string 410. When a loop between the second photovoltaic string 410 and the first photovoltaic string 400*a* to the first photovoltaic string 400*n* is conducted, the photovoltaic inverter 45 may convert, into an alternating current voltage, a direct current voltage provided by the first photovoltaic string 400*a* to the first photovoltaic string 400*n* and the second photovoltaic string 410, and supply power to the load based on the alternating current voltage.

Figure 11:
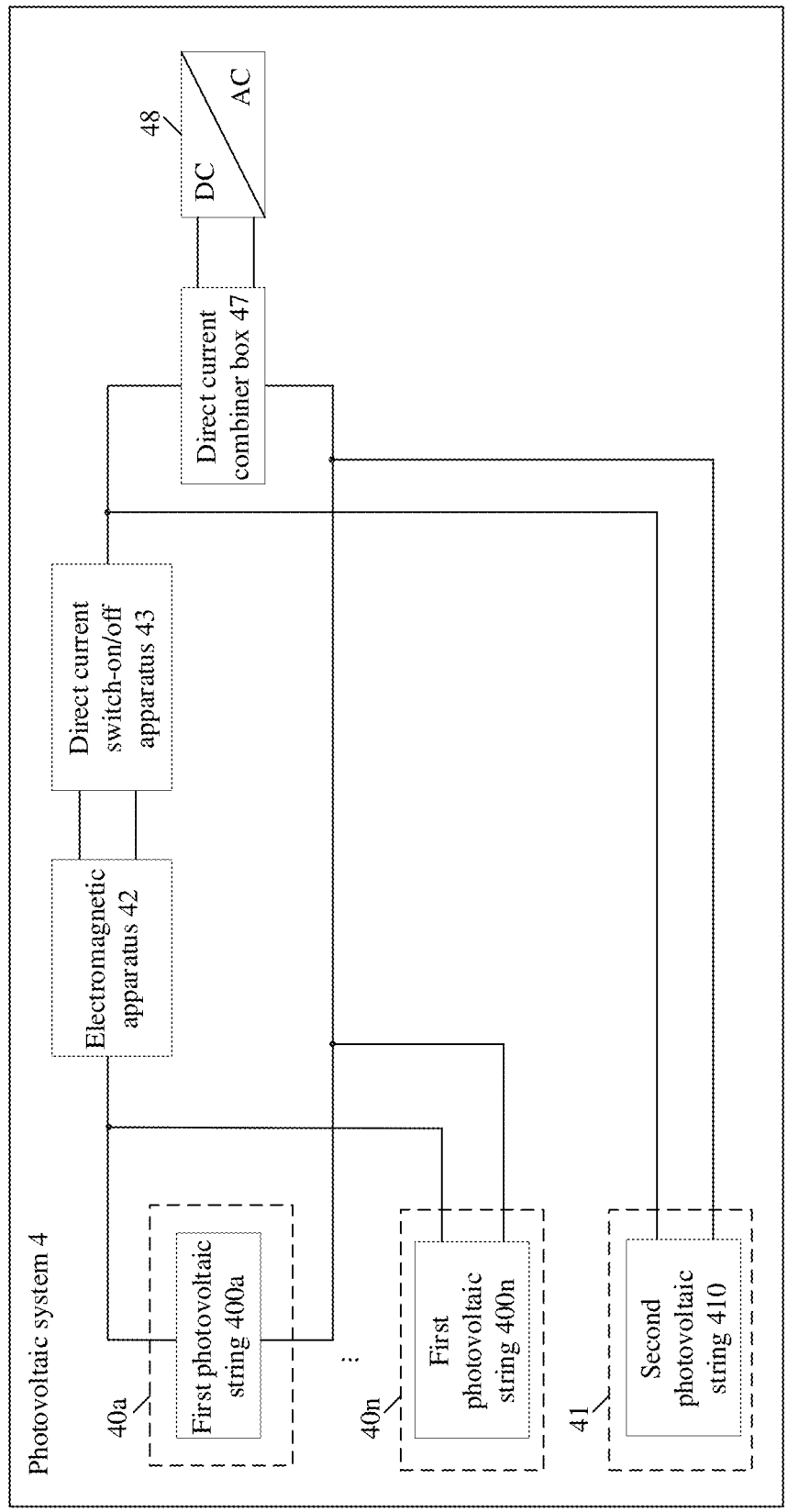
FIG. 11 is a schematic diagram of still yet another structure of a photovoltaic system.

In some feasible implementations, FIG. 11 is a schematic diagram of still yet another structure of a photovoltaic system according to the embodiments. As shown in FIG. 11, the photovoltaic system 4 shown in FIG. 7 further includes a direct current combiner box 47 and a DC/AC conversion module 48, the third connection end of the second direct current module 41 may be connected to the DC/AC conversion module 48 by using the direct current combiner box 47, and an output end of the DC/AC conversion module 48 may be connected to a load. Each of the first direct current module 40*a* to the first direct current module 40*n* and the second direct current module 41 includes a photovoltaic string. For example, as shown in FIG. 11, the first direct current module 40*a* includes a first photovoltaic string 400*a*, . . . , the first direct current module 40*n* includes a first photovoltaic string 400*n*, and the second direct current module 41 includes a second photovoltaic string 410. When each loop between the second photovoltaic string 410 and the first photovoltaic string 400*a* to the first photovoltaic string 400*n* is conducted, the direct current combiner box 47 may output a target direct current voltage to the DC/AC conversion module 48 based on the direct current voltage provided by the first photovoltaic string 400*a* to the first photovoltaic string 400*n* and the second photovoltaic string 410. In this case, the DC/AC conversion module 48 may convert the target direct current voltage into an alternating current voltage, and supply power to the load based on the alternating current voltage.

In the embodiments, the electromagnetic apparatus may trigger the direct current switch-on/off apparatus to disconnect the loop between each first direct current module and the second direct current module, to implement overcurrent protection for the reverse current flowing to each first direct current module. In addition, a quantity of electromagnetic apparatuses and a quantity of direct current switch-on/off apparatuses in the photovoltaic system are reduced, costs are lower, and a system structure is simplified.

The foregoing descriptions are merely implementations of the embodiments, but are not intended as limiting. Any variation or replacement readily figured out by a person skilled in the art within the scope in the embodiments shall fall within their scope.

What is claimed is:
1. A photovoltaic system, comprising:
   at least one first direct current module,
   an electromagnetic apparatus,
   a direct current switch-on/off apparatus, and a second direct current module,
   first connection ends of all the first direct current modules are connected in parallel and then connected to a first connection end of the electromagnetic apparatus, a second connection end and a third connection end of the electromagnetic apparatus are connected to a first connection end of the second direct current module by using the direct current switch-on/off apparatus, and second connection ends of all the first direct current modules are connected in parallel and then connected to a second connection end of the second direct current module; and when a current flows from the second direct current module to each first direct current module and an amplitude of the current is greater than a preset amplitude, the electromagnetic apparatus is configured to control the direct current switch-on/off apparatus to disconnect a loop between each first direct current module and the second direct current module.

2. The photovoltaic system according to claim 1, wherein the direct current switch-on/off apparatus comprises a switch-off apparatus, a moving contact, and a fixed contact, the second connection end of the electromagnetic apparatus is connected to the moving contact or the fixed contact, and the third connection end of the electromagnetic apparatus is coupled to the moving contact and the fixed contact by using the switch-off apparatus; and the electromagnetic apparatus is configured to: when the current flows from the second direct current module to each first direct current module and the amplitude of the current is greater than the preset amplitude, trigger the switch-off apparatus to drive the moving contact to be separated from the fixed contact, to disconnect the loop between each first direct current module and the second direct current module.

3. The photovoltaic system according to claim 2, wherein the electromagnetic apparatus comprises a magnetic yoke, a coil, a permanent magnet, a moving iron core, and a spring, the magnetic yoke completely covers the coil, the permanent magnet, and a part that is of the moving iron core that faces the first direct current module, the magnetic yoke partially covers a part of the moving iron core that faces the second direct current module, the coil is wound on the moving iron core, the permanent magnet is placed at an end that is of the moving iron core and that faces the first direct current module, an end of the moving iron core that faces the second direct current module is used as the third connection end of the electromagnetic apparatus to pass through the magnetic yoke and to be connected to the switch-off apparatus, the spring wraps a part of the moving iron core that passes through the magnetic yoke, an input end of the coil is used as the first connection end of the electromagnetic apparatus, an output end of the coil is used as the second connection end of the electromagnetic apparatus; and the moving iron core is configured to be ejected in a direction of the switch-off apparatus when the current flows from the second direct current module to each first direct current module and the amplitude of the current is greater than the preset amplitude, to trigger the switch-off apparatus to drive the moving contact to be separated from the fixed contact.

4. The photovoltaic system according to claim 3, wherein the moving iron core is further configured to: when the current flows from each first direct current module to the second direct current module, keep a location relative to the permanent magnet unchanged, to control the moving contact to keep connected to the fixed contact, so as to conduct the loop between each first direct current module and the second direct current module.

5. The photovoltaic system according to claim 2, wherein the electromagnetic apparatus comprises a magnetic yoke, a first coil, a second coil, a first permanent magnet, a second permanent magnet, and a moving iron core; and the magnetic yoke completely covers the first coil, the second coil, the first permanent magnet, the second permanent magnet, and a part of the moving iron core and faces the first direct current module, the magnetic yoke partially covers a part of the moving iron core and faces the second direct current module, the first coil and the second coil are wound on the moving iron core, a winding direction of the first coil is opposite to a winding direction of the second coil, the first coil and the second coil are connected in series, the first permanent magnet and the second permanent magnet are placed between the first coil and the second coil, an input end of the first coil is used as the first connection end of the electromagnetic apparatus, an output end of the second coil is used as the second connection end of the electromagnetic apparatus, and an end that is of the moving iron core and that faces the second direct current module is used as the third connection end of the electromagnetic apparatus to pass through the magnetic yoke and to be connected to the switch-off apparatus.

6. The photovoltaic system according to claim 5, wherein the electromagnetic apparatus further comprises a first magnetic pole and a second magnetic pole, the first magnetic pole is a magnetic pole facing the first direct current module, and the second magnetic pole is a magnetic pole facing the second direct current module; and the moving iron core is configured to move toward the second magnetic pole when the current flows from the second direct current module to each first direct current module and the amplitude of the current is greater than the preset amplitude, to trigger the switch-off apparatus to drive the moving contact to be separated from the fixed contact, so as to disconnect the loop between each first direct current module and the second direct current module.

7. The photovoltaic system according to claim 6, wherein the moving iron core is further configured to be located at the first magnetic pole when the current flows from each first direct current module to the second direct current module, to control the moving contact to keep connected to the fixed contact, so as to conduct the loop between each first direct current module and the second direct current module.

8. The photovoltaic system according to claim 1, wherein the photovoltaic system further comprises a direct current bus and a control module, and the first connection ends of all the first direct current modules are connected in parallel and then connected to the first connection end of the electromagnetic apparatus by using the direct current bus;

the control module is configured to collect a voltage of the direct current bus and a direct current of each first direct current module; and when the voltage is less than a preset voltage threshold and the direct current of each first direct current module is greater than a preset current threshold, control, based on the electromagnetic apparatus, the direct current switch-on/off apparatus to disconnect the loop between each first direct current module and the second direct current module.

9. The photovoltaic system according to claim 1, wherein each of the at least one first direct current module and the second direct current module comprises a photovoltaic string, a direct current DC/DC conversion unit, a direct current bus, a direct current distribution unit, or a load.

10. The photovoltaic system according to claim 1, wherein the first direct current module comprises a first photovoltaic string and a first DC/DC conversion unit, and the first photovoltaic string is connected in parallel to the first DC/DC conversion unit; and
the first DC/DC conversion unit comprises a first output end and a second output end, the first output end of the first DC/DC conversion unit is used as the first connection end of the first direct current module, and the second output end of the first DC/DC conversion unit is used as the second connection end of the first direct current module.

11. The photovoltaic system according to claim 10, wherein the first direct current module further comprises a direct current bus, and the first photovoltaic string is connected in parallel to the first DC/DC conversion unit by using the direct current bus.

12. The photovoltaic system according to claim 10, wherein the second direct current module comprises a second photovoltaic string and a second DC/DC conversion unit, and the second photovoltaic string is connected in parallel to the second DC/DC conversion unit; and
the second DC/DC conversion unit comprises a first output end and a second output end, the first output end of the second DC/DC conversion unit is used as the first connection end of the second direct current module, and the second output end of the second DC/DC conversion unit is used as the second connection end of the second direct current module.

13. The photovoltaic system according to claim 12, wherein the second direct current module further comprises a direct current bus, and the second photovoltaic string is connected in parallel to the second DC/DC conversion unit by using the direct current bus.

14. The photovoltaic system according to claim 10, wherein the second direct current module comprises a second DC/DC conversion unit and a second direct current distribution unit, and the second DC/DC conversion unit is connected in parallel to the second direct current distribution unit; and
the second direct current distribution unit comprises a first output end and a second output end, the first output end of the second direct current distribution unit is used as the first connection end of the second direct current module, and the second output end of the second direct current distribution unit is used as the second connection end of the second direct current module.

15. The photovoltaic system according to claim 14, wherein the second direct current module further comprises a direct current bus, and the second DC/DC conversion unit is connected in parallel to the second direct current distribution unit by using the direct current bus.

16. The photovoltaic system according to claim 1, wherein the first direct current module comprises a first DC/DC conversion unit and a first direct current distribution unit, and the first DC/DC conversion unit is connected in parallel to the first direct current distribution unit; and
the first direct current distribution unit comprises a first output end and a second output end, the first output end of the first direct current distribution unit is used as the first connection end of the first direct current module, and the second output end of the first direct current distribution unit is used as the second connection end of the first direct current module.

17. The photovoltaic system according to claim 16, wherein the first direct current module further comprises a direct current bus, and the first DC/DC conversion unit is connected in parallel to the first direct current distribution unit by using the direct current bus.

18. The photovoltaic system according to claim 1, wherein the first direct current module comprises a first photovoltaic string, a first DC/DC conversion unit, and a first direct current distribution unit, and the first photovoltaic string is connected in parallel to the first direct current distribution unit by using the first DC/DC conversion unit; and
the first direct current distribution unit comprises a first output end and a second output end, the first output end of the first direct current distribution unit is used as the first connection end of the first direct current module, and the second output end of the first direct current distribution unit is used as the second connection end of the first direct current module.

19. The photovoltaic system according to claim 18, wherein the first direct current module further comprises a direct current bus, the first photovoltaic string is connected to an input end of the first DC/DC conversion unit by using the direct current bus, and an output end of the first DC/DC conversion unit is connected to an input end of the first direct current distribution unit.

20. A direct current overcurrent protection apparatus, applicable to a photovoltaic system, the photovoltaic system comprising a first direct current module and a second direct current module, the first direct current module is connected to the second direct current module by using the direct current overcurrent protection apparatus, the direct current overcurrent protection apparatus comprising:
an electromagnetic apparatus and a direct current switch-on/off apparatus, a first connection end of the electromagnetic apparatus is connected to the first direct current module, and a second connection end and a third connection end of the electromagnetic apparatus are connected to the second direct current module by using the direct current switch-on/off apparatus; and
the electromagnetic apparatus is configured to: when a current flows from the second direct current module to the first direct current module and an amplitude of the current is greater than a preset amplitude, control the direct current switch-on/off apparatus to disconnect a loop between the first direct current module and the second direct current module.

* * * * *

UNITED STATES PATENT AND TRADEMARK OFFICE
CERTIFICATE OF CORRECTION

| | | |
|---|---|---|
| PATENT NO. | : 12,362,591 B2 | Page 1 of 1 |
| APPLICATION NO. | : 18/397404 | |
| DATED | : July 15, 2025 | |
| INVENTOR(S) | : Xiufeng Zhang et al. | |

It is certified that error appears in the above-identified patent and that said Letters Patent is hereby corrected as shown below:

In the Claims

Column 23, Claim 3, Line 37, please remove the words "that is".

Column 23, Claim 3, Line 60, please remove ",".

Signed and Sealed this
Eleventh Day of November, 2025

John A. Squires
*Director of the United States Patent and Trademark Office*